United States Patent [19]
Dobbins et al.

[11] Patent Number: 5,790,546
[45] Date of Patent: *Aug. 4, 1998

[54] METHOD OF TRANSMITTING DATA PACKETS IN A PACKET SWITCHED COMMUNICATIONS NETWORK

[75] Inventors: Kurt Dobbins, Bedford; Phil Andlauer, Londonderry; Chris Oliver, Rochester; Tom Parker, Merrimack, all of N.H.; Andy Grimes, Cape Neddick, Me.; Bruce Nutbrown, Campton, N.H.; Dan Hullette, Wilton, N.H.; Roger Dev, Durham, N.H.; Jason Jeffords, Dover, N.H.

[73] Assignee: Cabletron Systems, Inc., Rochester, N.H.

[*] Notice: The term of this patent shall not extend beyond the expiration date of Pat. No. 5,485,455.

[21] Appl. No.: 567,008

[22] Filed: Dec. 4, 1995

Related U.S. Application Data

[63] Continuation of Ser. No. 188,238, Jan. 28, 1994, Pat. No. 5,485,455.

[51] Int. Cl.[6] ............................................. H04L 12/56
[52] U.S. Cl. ............................................. 370/400; 370/392
[58] Field of Search ............................... 370/389, 392, 370/395, 396, 397, 400, 409, 410, 351, 388; 379/220

[56] References Cited

U.S. PATENT DOCUMENTS

| 4,894,822 | 1/1990 | Buhrke et al. | 370/60 |
|---|---|---|---|
| 4,987,536 | 1/1991 | Humblet | 395/200.71 |
| 4,991,171 | 2/1991 | Teraslinna et al. | 370/388 |
| 5,001,707 | 3/1991 | Kositoaiboon et al. | 370/440 |
| 5,113,499 | 5/1992 | Ankney et al. | 370/94.1 |
| 5,136,580 | 8/1992 | Videlock et al. | 370/94.1 |
| 5,161,192 | 11/1992 | Carter et al. | 380/48 |
| 5,226,120 | 7/1993 | Brown et al. | 395/200 |
| 5,261,044 | 11/1993 | Dev et al. | 395/159 |
| 5,274,631 | 12/1993 | Bhardwaj | 370/60 |
| 5,301,303 | 4/1994 | Abraham et al. | 395/500 |
| 5,317,566 | 5/1994 | Joshi | 370/400 |
| 5,357,508 | 10/1994 | Le Boudec et al. | 370/409 |
| 5,432,777 | 7/1995 | Le Boudec et al. | 370/397 |

OTHER PUBLICATIONS

Coral Broadband Enterprise Switch, Product Literature, Coral Network Corporation, Marlborough, MA (1994).

*Primary Examiner*—Hassan Kizou
*Attorney, Agent, or Firm*—Wolf, Greenfield & Sacks, P.C.

[57] ABSTRACT

Apparatus and method for establishing "virtual connections" through a packet switched data communications network, the network including a plurality of end systems and switches connected by links. Each end system has a unique physical layer address and each switch has a connection database of valid connections between different ports on the switch and a switching mechanism for establishing temporary connections. Each switch is registered with a connection server such that, prior to transmission of a connectionless datagram from a first end system to a second end system, a path of valid connections through one or more switches from the first end system to the second end system is determined by configuring the connection table of each switch on the path with a connection identifier identified by the physical layer addresses of the first and second end systems, and wherein the data packet remains as a connectionless datagram. In other aspects, an improved method is providing for allocating bandwidth among competing devices requesting access to a bandwidth limited shared resource (e.g., the previously defined switch), and to a search method for making a best path determination through the network based on a number of constraints.

11 Claims, 23 Drawing Sheets

12 PORT ETHERNET & BACKPLANE EXAMPLE

PORTS 1-12==ETHERNET
PORT 0==BACKPLANE
PORT 13==HOST CPU

WRAP REGISTER=ADDRESS 24

RAM TRAVERSED IN 25*400nS
OR APPX=10 uSEC

RAM IS TRAVERSED 100K/SEC

EACH ETHERNET GETS 100K*256 BITS
OR 25.6 MBITS/SEC

HOST GETS 100K*256
OR 25.6 MBITS/SEC

BACKPLANE GETS 100K*256*12
OR APPX=307 MBITS/SEC

NOTE: PORT NUMBERS ARE EXAMPLES

ADDRESS 0 PORT ID 1
ADDRESS 1 PORT ID 0
ADDRESS 2 PORT ID 2
ADDRESS 3 PORT ID 0
ADDRESS 4 PORT ID 3
ADDRESS 5 PORT ID 0
ADDRESS 6 PORT ID 4
ADDRESS 7 PORT ID 0
ADDRESS 8 PORT ID 5
ADDRESS 9 PORT ID 0
ADDRESS 10 PORT ID 6
ADDRESS 11 PORT ID 0
ADDRESS 12 PORT ID 13
ADDRESS 13 PORT ID 7
ADDRESS 14 PORT ID 0
ADDRESS 15 PORT ID 8
ADDRESS 16 PORT ID 0
ADDRESS 17 PORT ID 9
ADDRESS 18 PORT ID 0
ADDRESS 19 PORT ID 10
ADDRESS 20 PORT ID 0
ADDRESS 21 PORT ID 11
ADDRESS 22 PORT ID 0
ADDRESS 23 PORT ID 12
ADDRESS 24 PORT ID 0

Fig. 20

METHOD OF TRANSMITTING DATA PACKETS IN A PACKET SWITCHED COMMUNICATIONS NETWORK

This application is a continuation of application Ser. No. 08/188,238, filed Jan. 28, 1994, entitled NETWORK HAVING SECURE FAST PACKET SWITCHING AND GUARANTEED QUALITY OF SERVICE, and now U.S. Pat. No. 5,485,455.

FIELD OF THE INVENTION

This invention relates to communication networks, and more particularly to an apparatus and method for providing a high transfer rate, guaranteed quality of service, and secure internetworking of packet-based LAN and WAN segments by establishing temporary connections which are protocol-independent and transparent to the end systems. In addition, this invention is directed to allocating bandwidth by multiple levels of arbitration among competing devices requesting access to a bandwidth-limited shared resource, and to a search method for making a best path determination through the network based on a number of constraints.

RELATED APPLICATIONS

The subject matter of the present application may be advantageously combined with the subject matters of the following copending and commonly owned applications filed on the same date, and which are hereby incorporated by reference in their entirety:

U.S. Ser. No. 08/187,856 entitled "Distributed Chassis Agent For Network Management," filed Jan. 28, 1994 by Brendan fee et al., now U.S. Pat. No. 5,522,042;

U.S. Ser. No. 08/188,033 entitled "Fault Tolerant System Management Bus Architecture," filed Jan. 28, 1994 by Brendan Fee et al., now U.S. Pat. No. 5,485,576.

BACKGROUND OF THE INVENTION

Data networks today rely heavily on shared medium, packet-based LAN technologies for both access and backbone connections. The use of packet switching systems, such as bridges and routers, to connect these LANs into global internets is now widespread. An internet router must be capable of processing packets based on many different protocols, including IP, IPX, DECNET, AppleTALK, OSI, SNA and others. The complexities of building networks capable of switching packets around the world using these different protocols is challenging to both vendors and users.

Standards-based LAN systems work reasonably well at transfer rates up to about 100 Mbps. At transfer rates above 100 Mbps, providing the processing power required by a packet switch interconnecting a group of networks becomes economically unrealistic for the performance levels desired. This inability to economically "scale up" performance is beginning to cause restrictions in some user's planned network expansions. Also, today's data networks do not provide network managers with enough control over bandwidth allocation and user access.

Tomorrow's networks are expected to support "multimedia" applications with their much greater bandwidth and real-time delivery requirements. The next generation networks should also have the ability to dynamically reconfigure the network so that it can guarantee a predetermined amount of bandwidth for the requested quality of service (QOS). This includes providing access, performance, fault tolerance and security between any specified set of end systems as directed by the network's manager. The concept is to provide network managers with complete "command and control" over the entire network's infrastructure—not just tell them when a failure has occurred.

A new set of technologies known as asynchronous transfer mode (ATM) may provide the best, long-term solution for implementing the requirements of both private and public internets. ATM promises to provide a more economical and scalable set of technologies for implementing the ultra-high-performance information networks that will be required to provide the quality of service users will demand. Thus, over the next 20 years, the network infrastructure may change from packet-based standards to one based on ATM cell switching. While changes in the accompanying network will be dramatic, it would be desirable for users making the transition to be able to retain their most recent equipment investment.

Another expected change in tomorrow's networks is a change in data flow. Data flow in today's network typically follows the client-server computing model. This is where many clients are all transferring data into and out of one or more network servers. Clients do not normally talk to each other; they share data by using the server. While this type of data exchange will continue, much more of the information flow in tomorrow's networks will be peer-to-peer. Since the ultimate goal is a truly distributed computing environment where all systems act as both the client and server, more of the data flow will follow a peer-to-peer model. The network will be required to provide more direct access to all peers wishing to use high-performance backbone internets connecting, for example, the desktop computers.

The bulk of information transported in the future will be of digital origin. This digital information will require a great deal more bandwidth than today's separate voice, fax, and SNA networks which operate with acceptable performance using voice grade telephone lines. Voice will shrink as a percentage of total traffic, while other forms of information including image and video will greatly increase. Even when compressing is available, the bandwidth requirements for both inside and outside building networks will need to be greatly expanded.

Text files and images can be sent over existing packet-based networks because the delivery of this information is not time critical. The new traffic (voice and video) is delivery time sensitive—variable or excessive latency will degrade the quality of service and can render this information worthless.

Thus, the new infrastructure requirements are expected to include:

increased workstation processing power at the desktop, which is driving the need for increased network performance and capacity;

increased numbers of network users, which is driving the need for increased network security;

network access and bandwidth allocation must be managed;

integrated voice, video and data applications are increasing the need to be able to guarantee improved network quality of service (QOS);

management must be able to provide a variable quality of service to each user based on their particular needs (a user's needs may change at any time);

the ability to guarantee each user's QOS can only be achieved by tightly integrating the network and its management systems.

It is an object of the present invention to provide an apparatus and method which satisfies one or more of the above-mentioned requirements.

SUMMARY OF THE INVENTION

In one important aspect, the present invention is a new technology referred to as secure fast packet switching (SFPS). SFPS will provide the same or better reliability and security as routers and with much greater packet switching performance, without an increase in cost. This is because the complexities and costs of providing multi-protocol routers increase greatly as performance needs go up. Also, SFPS provides the following capabilities, which routers cannot provide:

- ability to create many separate, logical work group LANs on the same physical network
- ability to create many separate virtual connections or circuits with a specified quality of service (QOS)
- ability to guarantee a requested QOS—time sensitive delivery
- ability to account for network use (why is the phone bill so high?)

Although ATM cell switching may similarly provide many of these new capabilities, adoption of cell switching would require that all existing networks be re-engineered. SFPS provides a transition between the packet based technologies of today and the cell based technologies of tomorrow. SFPS will enable a mixed packet and cell based network infrastructure to operate as one seamless switching fabric using the same service and configuration management system to deliver the QOS that users demand.

SFPS provides for high performance packet switching based on source and destination MAC IDs—the unique medium access control (MAC) address assigned to each end system by the IEEE. End-to-end connections are determined by a network management application that provides security and best path routing determinations based on a number of constraints. By switching packets based only on MAC layer information, the network infrastructure can remain protocol insensitive. This allows the network to provide an equal QOS to users sending packets based on NetBIOS, LAT, IP, IPX, SNA, or any other protocol. As protocols evolve the network and its management infrastructure will not have to be reworked to support the new protocols.

More specifically, the system uses source and destination MAC addresses which alone, or in combination with the input port on the switch, form a unique "connection identifier" for any communication exchange between end systems to be connected through an SFPS device. A specific example is as follows:

input port=2
source MAC address=00:00:1D:01:02:03
destination MAC address=00:00:1D:11:22:33; together, these form a "tuple" bound to a specific uni-directional flow from source address to destination address. All packets that have this tuple are automatically switched according to the operation of the SFPS.

Network infrastructures are built up around a core switching fabric. The switching fabric provides the physical paths or routes that allow users to send information to each other. Access to the switching fabric is gained through an access port. Access ports provide several functions—most importantly, they provide security and accounting services. Access ports also provide the network operator with the ability to monitor and control the access into and use of the switching fabric. End point systems such as personal computers (PCs), workstations, and servers connect to the access port using one of many access technologies such as Ethernet, Token Ring, FDDI, or ATM.

In a SFPS network, the access port acts as a management agent that performs five functions for the end point system. First, it provides directory services. Second it provides network access security services. Third, it provides routing services. Fourth, it provides the ability to reserve bandwidth along a path in the switching fabric. Finally, it provides accounting services. These five services: directory, security, routing, bandwidth management and accounting are required to provide a reliable network infrastructure.

In traditional bridge and router devices, each packet is treated as an independent unit of data called a datagram which is individually processed by application of access and security constraints, as well as path determination. In SFPS, this processing is done only on probe packets (common on LAN broadcast mediums) which are decoded, and through the use of a directory of end systems containing policy, call attributes, location, paths, quality of service, etc., the connection is either rejected or accepted, in which case the path is determined and switches along the path are "programmed" to allow subsequent packets on this "connection" to be switched. In either case, subsequent datagrams are either switched or discarded without having to re-apply all of the security and access control and path determination logic.

Another important aspect of the present invention is a method of determining a path between two nodes (end systems) on the network which has the following properties: the path is optimal for one metric and passes a set of threshold tests for a number of other metrics; and, it must do so within a given time constraint. The method is a breadth first recursive search in parallel which is initiated at the source node and proceeds outwardly to discover neighboring nodes and calculate traversal paths until reaching the destination node. The method includes a series of "pruning steps" to insure that the number of potential paths does not grow towards infinity and to limit the memory requirements and processing time of the search. Because of these real-world constraints (time, memory, processing), the path result may not be the mathematical (theoretical) best path, in every case, but the search will pursue those paths having a high probability of being the best path considering the constraints and in that sense the search will make a best path determination. Generally, the metrics include cost, bandwidth, policy, loss, etc. While a specific embodiment of the method is useful in determining an optimal path through the network, the method has much broader applications.

In another aspect, the present invention provides a method and apparatus allowing multiple levels of arbitration among competing devices requesting access to a bandwidth-limited, shared resource.

The first level of arbitration is programmable. The available bandwidth of the bandwidth-limited, shared resource can be equally allocated between all competing devices or some of the competing devices can be allocated more bandwidth than others. This feature of the present invention is useful when the maximum aggregate bandwidth requirements of the requesting devices are greater than the bandwidth of the shared, bandwidth-limited resource. Because it is programmable, the arbitration system of the present invention can be used to allocate the available bandwidth to prioritize those competing devices that may more urgently need the bandwidth-limited, shared resource and other competing devices will only be allocated a fraction of the bandwidth that they actually need. However, these other competing devices will be allowed to use free time segments, thus effectively being able to use more bandwidth than they are programmed for in the first level of arbitration.

For those competing devices requiring isochronous service (including, but not limited to voice data and video data), only the first level of programmable arbitration is used. These devices are programmed not to participate in any other levels of arbitration except the first level. This allows these competing devices to use the time segments that are programmed for them, but not any of the time segments that may become available when a device does not require its programmed time segment. For example, an audio communications link requiring a very deterministic service policy would be programmed to use only the first level of arbitration and not any free time segments. The arbiter of the present invention is programmed with an adequate number of segments to support the bandwidth requirements of the audio communications link. These time segments are made available to the audio communications link in a periodic way that matches the bandwidth requirements of the device.

Additional levels of arbitration are provided to allocate unused time segments that may be available after the first level of arbitration to competing devices if the competing devices are programmed to participate in the additional levels of arbitration. The second and third levels of arbitrations allow unused time segments that may be available after the first level of arbitration to be assigned to other competing devices. The second level of arbitration provides a Round-Robin type of arbitration scheme that is used to allocate a free time segment to the competing device having the allocation token. If the competing device having the allocation token is not requesting use of the bandwidth-limited, shared resource, then a third level of arbitration is provided. In the third level of arbitration, each of the competing devices participating in the third level is assigned an identification number and placed in a list and the remaining free time segment is allocated to the competing device having a predetermined rank in the list. For example, the predetermined rank may be based on the sequential order of the identification numbers. The unallocated time segment might be allocated to the requesting competing device having a particular identification number, such as the lowest or highest identification number.

A key feature of the present invention is that arbitration is performed using a hierarchy of programmable arbitration schemes. The first level of arbitration is, for example, a programmable time division multiplexing arbiter. The second level of arbitration, which acts only to allocate any unused time segments after the first level of arbitration is, for example, a Round-Robin type arbiter. The third level of arbitration, which acts to allocate any time segment that remains unallocated after the second level of arbitration is a default level of arbitration that selects one of the requesting competing devices according to a predetermined scheme.

Another advantage of the arbitration system of the present invention is that arbitration is performed in parallel with data transfer cycles. That is, the competing device that is to be given exclusive use of the bandwidth-limited, shared resource is decided in the time segment prior to the time segment in which a data transfer is to occur. The arbitration decision is made at the same time that a data transfer is occurring in a time segment. This pipelining of decision making effectively makes the arbitration cycles look transparent to the competing devices and does not consume any portion of the available data transfer time.

The arbitration system of the present invention can support devices having different bandwidth requirements (i.e., different data transfer rates) in the same system because the system is programmable. In one embodiment of the invention, the granularity (that is, the amount of bandwidth represented by a time segment) of the time segments is programmed using an allocation memory. As the number of time segments in the allocation memory is increased, the granularity of bandwidth allocation becomes finer. Therefore, the arbitration system can meet the bandwidth requirements for competing devices that have differing bandwidth requirements. For example, a competing device having a low bandwidth can be assigned only a single time segment, since the low bandwidth device requires less frequent servicing. On the other hand, a competing device having a higher bandwidth could be assigned multiple contiguous time segments, thus allowing that device to complete a data transfer.

Another feature of the present invention, since it is a programmable arbitration system, is that the type of arbitration for each device may be programmed on a device by device basis. For example, a device may be programmed to participate only in the first level of arbitration and not in the second or third levels. In the same way, a device could be programmed to participate only in the second and/or third levels of arbitration. This makes the system more flexible depending upon the particular application and helps to guarantee quality of service for each competing device.

Many aspects of the previously defined inventions may be constructed as: software objects which exist in embedded devices as firmware; software objects which are part of an application on a commercial computer system; or Application Specific Integrated Circuit (ASIC) or functionally equivalent hardware components.

These and other functions and benefits of the present invention will be more fully described in the following detailed description.

BRIEF DESCRIPTION OF THE DRAWINGS

FIG. 20 is an illustration of the TDM RAM programming illustrating the arbitration method applied to an SFPS switch;

DETAILED DESCRIPTION

The detailed description is separated into the following subsections for ease of reference:

1. Establishing "Virtual LANs" and "Virtual Connections"
   1.1 Example 1—M11 transmits a packet destined for M99
   1.2 Example 2—M11 transmits a packet destined for M66
2. SFPS Management Services
   2.1 Route Services Management
   2.2 Access Security Management
   2.3 Directory Services Management
   2.4 Accounting Management
   2.5 Bandwidth Management
3. SFPS Hardware Implementation
4. Canonical Frame Representation
5. Networking Chassis With SFPS Modules
6. SFPS Functions
7. SFPS Host Agent
8. SPFS Distributed Switch
   8.1 Example of IP Packet Flow Through Distributed Switch
   8.2 Distributed Switch MIB
9. Best Path Determination
   9.1 Example of Best Path Determination
   9.2 Data Structures
   9.3 Flow Chart
10. Allocation of Bandwidth
    10.1 Discussion of the Related Art
    10.2 New Apparatus and Method for Allocating Bandwidth
    10.3 Example of Bandwidth Allocation For SFPS Module
11. SFPS Software Object Model
    11.1 SFPS Objects
    11.2 SFPS Application Threads

1. Establishing "Virtual LANs" and "Virtual Connections"

Figure 1:
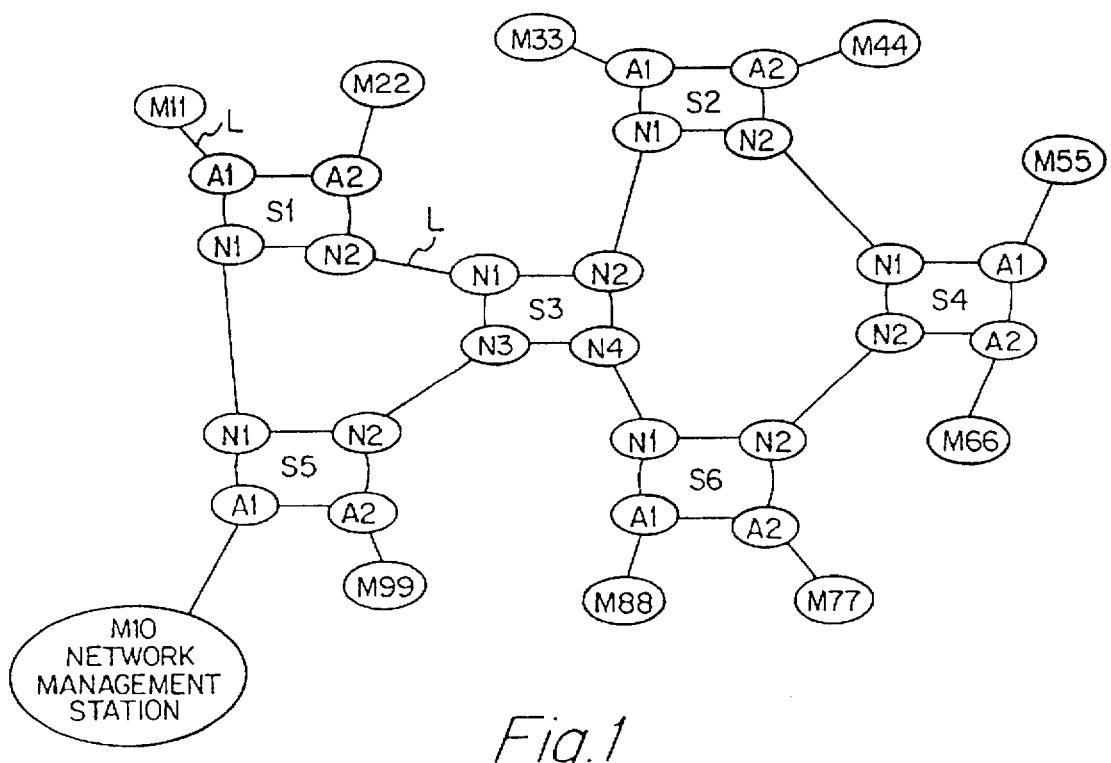
FIG. 1 is a schematic illustration of a network topology built with SFPS switches.

FIG. 1 shows a representative network topology built with six secure fast packet switches (SFPS) labeled S1 to S6 connected by links L. Each SFPS switch has for example, four ports. Some ports are labeled A for Access and some are labeled N for Network. Access ports provide network access security and packet routing services. Network ports do not perform security services since this function has already been performed at the original entry access port. The end systems are connected to the switches by links L and are labeled "M"; one of the end systems M10, comprises a network management server (NMS). This NMS will also contain the SFPS directory and path server.

Each SFPS includes a function known as a Connection Database Look-Up Engine (CDLUE). The CDLUE's job is to check the source and destination MAC IDs of a packet received by the SFPS against its internal database, called the connection table. The CDLUE will forward (route) packets out one or more ports based on the results of the connection table look-up. This function is similar to a bridge except that SFPS uses both the source and the destination MAC IDs to make the forwarding decision. Bridges only use the MAC destination address. Also, if a bridge isn't sure where a destination is, it will forward the packet out all ports except the one it came in on. This "flooding" results in loss of control over network access, bandwidth, information security, network performance and reliability. Because SFPS uses both the source and destination addresses it does not have the failings of current bridges and routers.

The network topology view of FIG. 1 will be used to illustrate how "virtual LANs" and "virtual connections" can be built to enable protocol insensitive routing and increased network security to be achieved. In this case, there are two logical work group LANs: WG1=(M11, M22, M99), and WG2=(M33, M55, M77). Two connections will be attempted: (M11, M99) and (M11, M66).

1.1 Example 1—M11 transmits a packet destined for M99.

1. Access switch S1 receives this packet on inbound port A1.
2. S1 looks up in its connection table to determine if a valid connection (M11 to M99) exists.
3. No connection is yet defined so S1 initiates a message exchange to the SFPS Server (Network Management Station) M10. This message exchange is an independent exchange between the switch S1 and the server M10.
   a) The switch sends a message asking if M11 can (is allowed) to talk to M99. This is where security, policy and administrative constraints are applied.
   b) If the two stations are allowed to have a connection, then the server M10 will determine the path of switches to be used to provide a logical connection between M11 and M99.
   c) Since M11 can reach M99 by two different paths, one "best" path is selected. "Best" is constrained by, for example, cost, bandwidth, policy, loss, and other metrics.
   d) Let's assume the best path is chosen as traversing S1 to S3 to S5.
   e) The server M10 will then "program" each of these switches to support this connection path.
   *Important point: Since SFPS has to be transparent in the M11–M99 interaction, it cannot modify the packets being exchanged. Typically, in traditional switches, the switch sets a connection-identifier that gets put in each packet, and is remapped at each switch, to allow the packet to be switched along the path. Since SFPS cannot touch any packet content, it has to have something in the existing packet that it can use in each switch to treat as a unique connection-identifier while preserving the M11 to M99 packet exchange. What is unique about SFPS is that it treats:

— source MAC address
— destination MAC address
as a unique "connection-identifier." Note, that this is an implicit connection-identifier in each packet based on the arriving inbound port, but is an explicit connection-identifier in each switch's connection table.

f) Each of the switch's connection tables will look like this:

|     | Source Port | Source MAC | Dest MAC | Outport |
| --- | --- | --- | --- | --- |
| S1: | A1 | M11 | M99 | N2 |
| S3: | N1 | M11 | M99 | N3 |
| S5: | N2 | M11 | M99 | A2 | g) So, once all these switches are programmed (through, for example, SNMP Network Management Protocol), a packet from M11 destined for M99 would look like this:

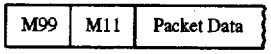

and would be "switched" along the path as follows:

M11→A1-S1-N2→N1-S3-N3→N2-S5-A2→M99 h) Note that once the switches have these connections defined, the packets traverse M11 to M99 without any additional call-setup or network management interaction. This provides the fast packet switching between the end systems. Note, the M11 to M99 packet exchange occurs as if they were directly connected on the same LAN segment. Thus, the "virtual LAN" is provided, as well as transparent switching.

i) At each switch, the switch looks up in the packet the source and destination MAC addresses and combines them with the inbound (source) port to form the connection identifier. If this connection is in its table, the packet will be forwarded (switched) out the designated output port. All subsequent M11 to M99 packets will take the same path through the switches. Note if a valid source-destination MAC pair arrives on a port other than the defined inport, it will be considered a security violation.

j) These "virtual connections" exist until they are explicitly removed by the network management system. This could be due to timeout (idle connection) or resource management. No explicit disconnect is done by M11 or M99.

1.2 Example 2—M11 transmits a packet destined for M66

1. If M11 also transmits data destined for M66, the same set of processing would be done:
   a) S1 receives the packet.
   b) S1 looks up in its connection table and with no match will send a message to server M10.
   c) Server M10 will reject the packet as unauthorized (not within one of the two approved logical work group or "virtual" LANS) and the packet will be dropped without a connection being made. An alarm may be set to indicate that an unauthorized transmission has been attempted.

2. SFPS Management Services

In this particular embodiment, the SFPS switches require five management service functions to be performed at a higher layer in the network management framework. The five functions are: Route Service, Access Security, Directory Service, Accounting, and Bandwidth Management. A general review of each management function is provided below. The functions are usually performed in software and may reside on none, some, or all SFPS in a network. Since some of the management functions are required by multiple-user applications, they may be shared and would be already available.

2.1 Route Services Management: These services are required so the SPFS can determine the best path to route a connection. When there are many possible "paths" to a destination, the route management will determine which one should be used and pass this information to the SFPSs so that their connection databases can be configured correctly. A preferred method of making a best path determination is described in a later section.

2.2 Access Security Management: These services are optional and can be used to limit user access to only a specified group of SFPS access ports. An access group may contain from 2 to any number of users. Users can only send or receive packets from members of their access group. Access to any other access ports would be prevented by filtering out those packets. Security also includes administrative policies.

2.3 Directory Services Management: These services provide the Route Services Management with a user to access port and switch database so that packets destined for users not directly connected to the local access switch can be located and then have a path to that switch selected. This service reduces the amount of time it takes for a connection to be established. An ISO X.500 Directory Services may be used which is compatible with NIS, Novell 4.0 and others.

2.4 Accounting Management: These services provide an accounting of each user's use of the network and provide the network manager with usage and cost reporting so that proper use of corporate network resources can be verified and traced.

2.5 Bandwidth Management: As network usage grows, congestion of the network connection will likely occur. The bandwidth management service insures that bandwidth is allocated to highest priority users first and that the network is always available for those users should congestion occur. Lower priority users would have their packets dropped when congestion occurred. A specific multi-level programmable arbiter for making bandwidth allocations is described in a later section.

3. SFPS Hardware Implementation

Figure 2:
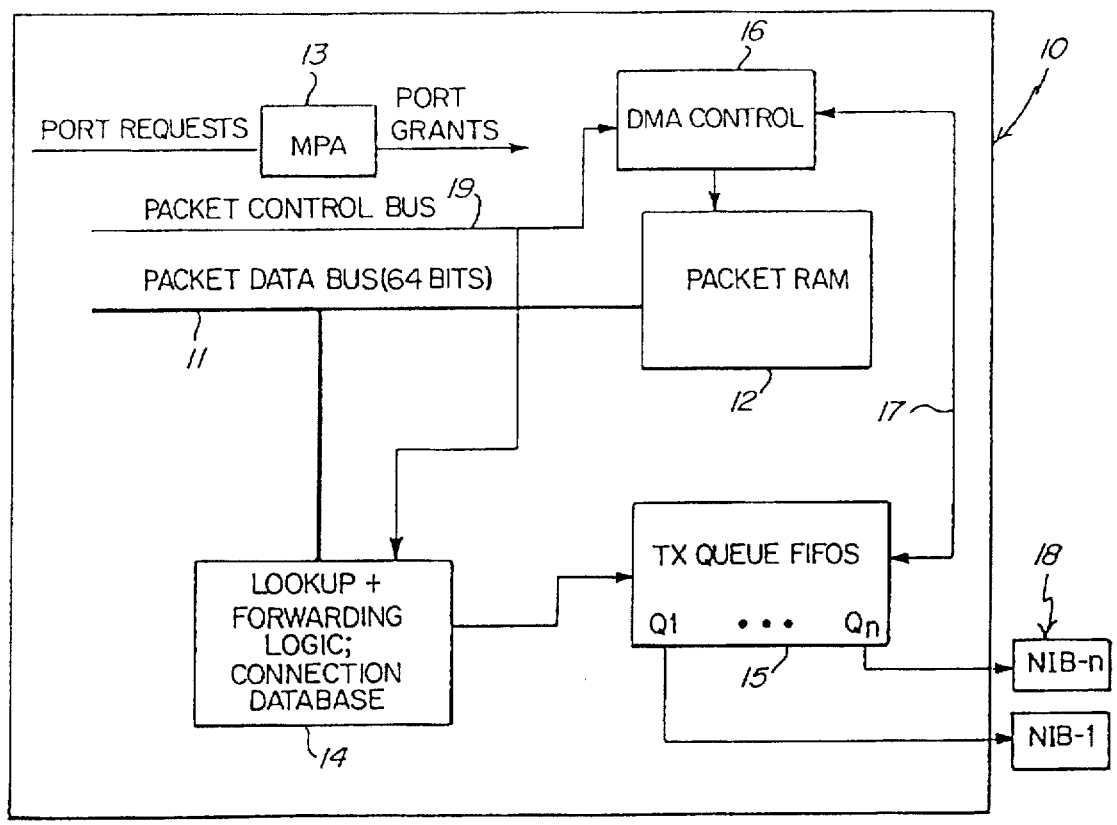
FIG. 2 is a schematic illustration of the internal components of an SFPS switch in a hardware embodiment.
Figure 3:
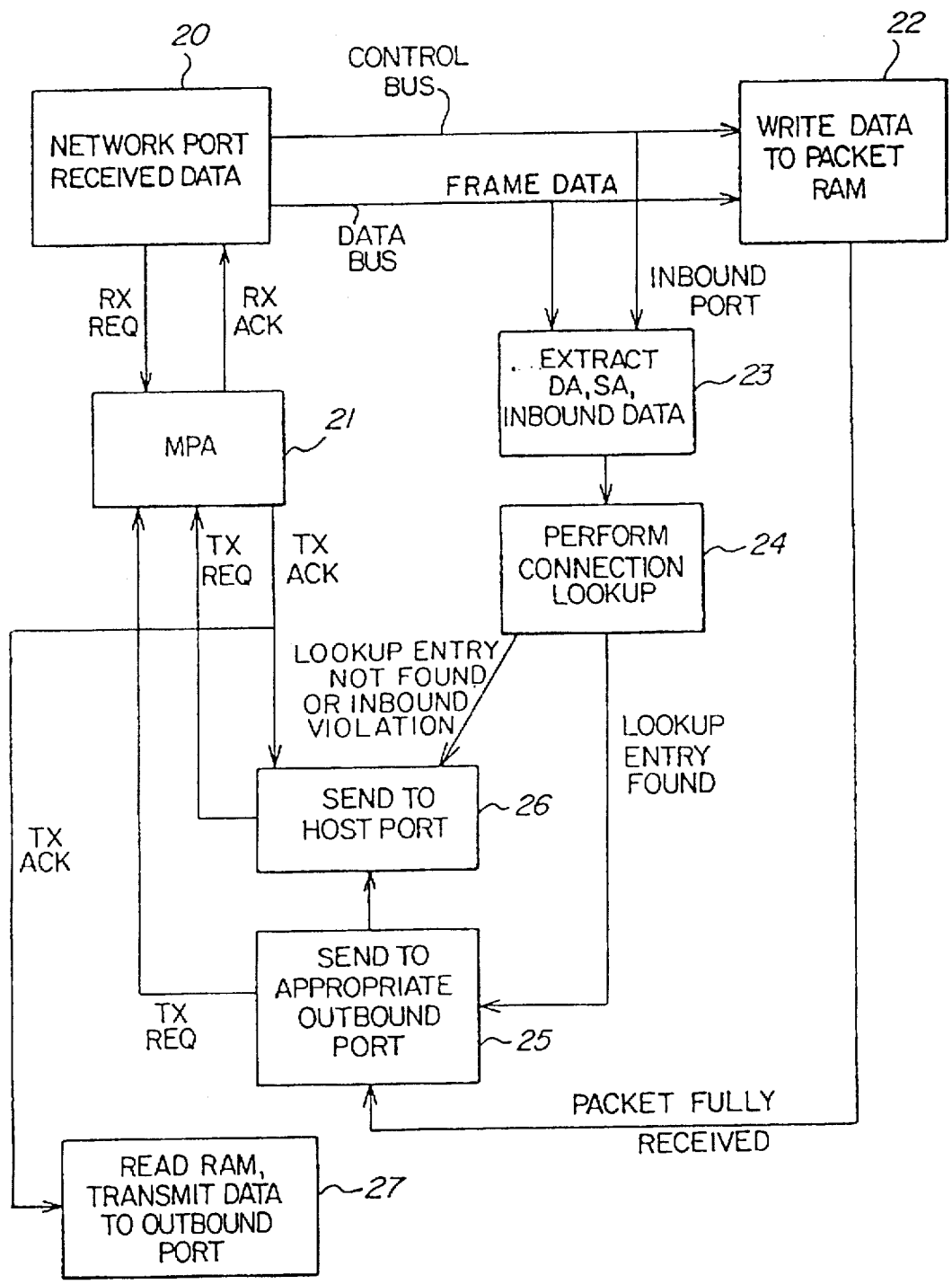
FIG. 3 is a flowchart of the operation of the SFPS switch of FIG. 2.

In a specific hardware embodiment, the SFPS is a multiported data communications device shown in FIG. 2 (physical layer—external ports not shown). FIG. 3 is a flow chart showing the frame processing of the SFPS switch.

Data enters the SFPS 10 through one of its ports in a format known as the Canonical Frame Format, which is described in a later section. The canonical frame format has the following structure:

TABLE 1

Canonical Frame Format

| Header | Destination Address | Source Address | LLC Field | Information Field | Check Sum |
|---|---|---|---|---|---|
| (64 bits) | (64 bits) | (64 bits) | (64 bits) | (0 or more bytes) | (16 bits) |

As shown in FIG. 2, the SFPS 10 has a common 64 bit wide packet data bus 11 that is shared by all ports, as well as by a memory array referred to as "packet ram" 12. When data arrives at a given port (step 20 in FIG. 3), the port signals to a multi-level programmable arbiter (MPA) 13 that it is ready to transfer data into the SFPS system (step 21). The MPA is used to allow each port a "timeslice" on the bus 11 so that data may be transferred into the SFPS and stored into packet ram.

The SFPS system requires ports that deliver data in to deliver an entire packet before beginning the next packet. The packet data bus control system in conjunction with the MPA establishes a 10 clk (clock) cycle "timeslice" for data transfers (32 bytes of information). Transfers can be in either direction. Inbound transfers are referenced as a port delivering data into the packet ram, and outbound transfers are those in which data is sourced from the packet ram and sent out through a port towards the datalink. A transfer of the data packet in or out of the SFPS may take multiple timeslices.

When a port receives an acknowledgment from the MPA, it signals "start of frame" (SOF) on the control bus 19. This informs the lookup process that the beginning of a data packet will be traversing the bus 11 and that it should copy the DA and SA fields so that it may proceed with a lookup operation (step 23). Now, in parallel, the lookup process will be forming the results word (steps 24, 26) while the port continues to transfer the entire packet into the packet ram 12 (step 22), controlled by the DMA process. Once the end of the data packet is delivered, the port signals "end of frame" EOF which tells the DMA 16 that it is done. This causes the DMA, who has been maintaining a byte count for the packet, to transfer this information to the forwarding process along with a pointer to the location of the data packet in packet ram. Additionally, the input port number is sent to the forwarding process (from the DMA). The forwarding process then proceeds.

The common bus 11 also indicates which port is transferring the data into the packet ram 12; this information is used by the lookup circuitry 14 so that it may associate the DA-SA data with a certain inbound port (step 24). The lookup circuitry 14 is where the connection database table is maintained. This table is what is established by the SFPS connection setup application. It indicates for a particular DA-SA pair on which port(s) the data shall be sent outbound (step 25). The table also provides a field which identifies the allowable in-port for this DA-SA connection. The lookup circuitry will match the actual inbound port with the allowable in-port to ensure that the data has entered this switch from a pre-authorized location (step 24).

The lookup process passes an information structure to the forwarding logic, which the forwarding logic acts on. The information structure, known as the "results" word, contains the following:

1) In_port—the allowable in_port, used by the lookup process.

2) Out_port/Index—this will be a single port number, or an index into a ram which contains a port_mask to be used when the packet is intended to be delivered out more than one port. This ram is located within the forwarding logic.

3) The actual in_port—to be used for statistics collection, since the lookup process has performed the in_port match against the allowable in_port field.

4) In_port violation—a single bit indicating that the in_port check passed/failed; this is used by the forwarding logic.

5) Unknown connection—a bit indicating that the connection entry was not found in the connection database. This packet will be delivered to the host for directory assistance.

The forwarding logic acts on this data to produce a "outmask." This is a mask that is as wide as the number of ports in the system. This mask, for each bit set, indicates the desire to forward this data packet out the specified ports.

The forwarding logic 14 waits on two pieces of information to complete its task, which is to write the outmask to the transmit queue logic 15. One piece of information is the results word for a given port (from the lookup logic—step 24); the second is a data structure that is written by the DNA control logic 16 (a pointer to where data resides in packet RAM—step 22).

The forwarding process upon receiving this structure from the DMA checks with the lookup process for the completion of the table search and result word formation for that port. If lookup search and frame reception are both complete, the forwarding process 14 then translates the out_port information into a mask which it writes to the transmit queues 15.

There exists at least one transmit queue per port (see $Q_1, \ldots, Q_n$ in transit queue 15 of FIG. 2). Each queue is connected to a network interface block 18 (—$NIB_1, \ldots, NIB_n$, respectively—). If an entry exists on a queue, the port that the queue is associated with is signalled so that the port may request that information. A queue entry is merely a pointer to a data packet which resides in packet ram. This pointer is what the forwarding process writes onto the queue in what is called a forwarding operation. The port then signals to the MPA 13 that it wishes to perform an outbound data transfer. Once granted, the DMA controller 16 will source the appropriate data from the packet ram 12 onto the packet data bus 11 (step 27). There is a link 17 between the DMA control process and the queue process. When transmitting, the DMA reads the pointer entry off the appropriate queue based on the port number that is requesting the transmit operation. All along, the DMA process has been maintaining in its internal memory the length of each packet in the packet ram. When the pointer is read from the queue and the transmit operation begins, the DNA process decrements a working count value which is first loaded with the full packet length. As transmission proceeds and this counter reaches zero, the DMA process signals "end of frame" (EOF) and the port stops requesting data transfers (unless there is another entry on its transmit queues).

4. Canonical Frame Representation

Different data links (LAN segments) specify and use dissimilar formats to encapsulate and represent data. In order to provide an extensible system, it is advantageous for each data link sub-system to translate incoming frames, and represent them canonically. Intermediate systems, such as the networking chassis backplane, then need only understand this canonical representation in order to operate on the received frames.

To this end, it is expected that data link sub-systems will translate incoming frames from native to the canonical format, and perform the converse operation for frames to be transmitted. In the later-described embodiment entitled "Networking Chassis With SFPS Modules", a networking chassis having a common bus receives removable modules; if all external interfaces on a particular module are similar, the module may choose to translate (from native to canonical) before transmission out onto the common chassis bus. The point of translation within any module is a realization issue.

The encapsulation method utilized herein is 802.2 LLC, more specifically 802.2 SubNetwork Access Protocol (SNAP) SAP. It provides mechanisms to encapsulate DIXE frames, with no loss of information content. Using this mechanism, and accounting for various datalink address formats, the canonical representation is as follows:

TABLE 1

Canonical Frame Format

| Header | Destination Address | Source Address | LLC Field | Information Field | Check Sum |
|---|---|---|---|---|---|
| (64 bits) | (64 bits) | (64 bits) | (64 bits) | (0 or more bytes) | (16 bits) |

The "header" is a packet description provided for use by the SFPS switch. The "destination address" is the physical MAC address of the destination end system. The "source address" is the physical MAC address of the source end system. The LLC field is the IEEE 802.2 LLC header. The "information field" is the client layer data. The "check sum" is a 16 bit field for confirming packet integrity.

5. Networking Chassis With SFPS Modules

Figure 4:
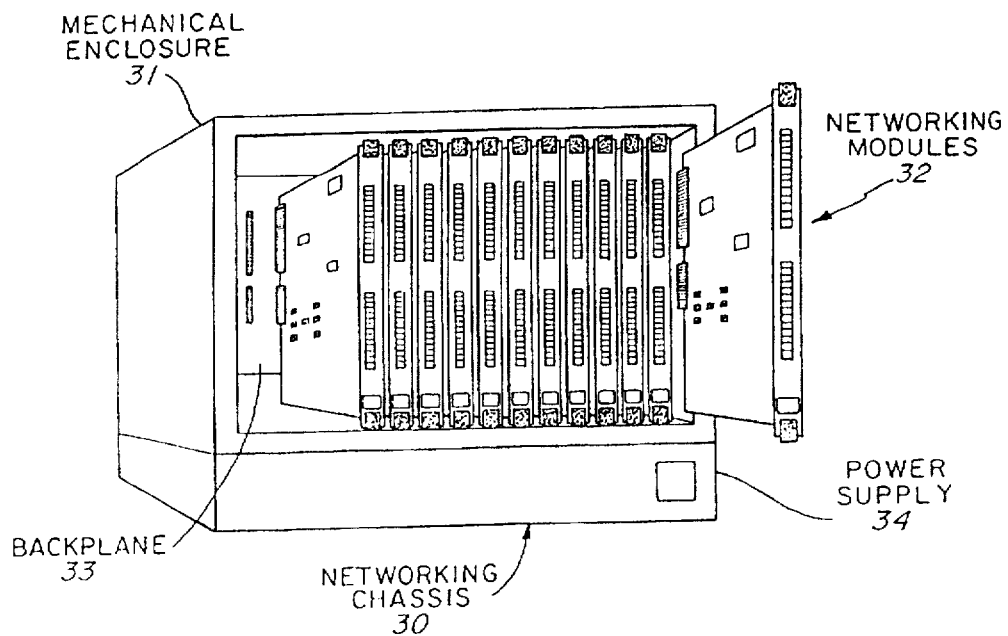
FIG. 4 is a perspective view of a networking chassis with removable modules.

FIG. 4 is an illustration of a networking chassis adapted to incorporate the SFPS technology. As shown, the chassis 30 is a mechanical enclosure 31 which is used to house a plurality of networking modules 32, which may include repeater modules, bridge modules, router modules, terminal servers, file servers, etc. The chassis provides slots into which the networking modules are inserted. In addition to being a mechanical enclosure, the chassis provides a backplane 33 through which the modules inserted into the chassis are provided power from the chassis' power supply 34 and networking connectivity between modules. The backplane includes a system management bus (SMB) for network management functions, and a high-speed data bus known as the INB.

The chassis or hub enables the connection of diverse LAN segments, including Ethernet, Token Ring and FDDI segments, as well as to wide area networks (WANs). In addition, the chassis provides connection to an asynchronous transfer mode (ATM) switch across its backplane.

Figure 5:
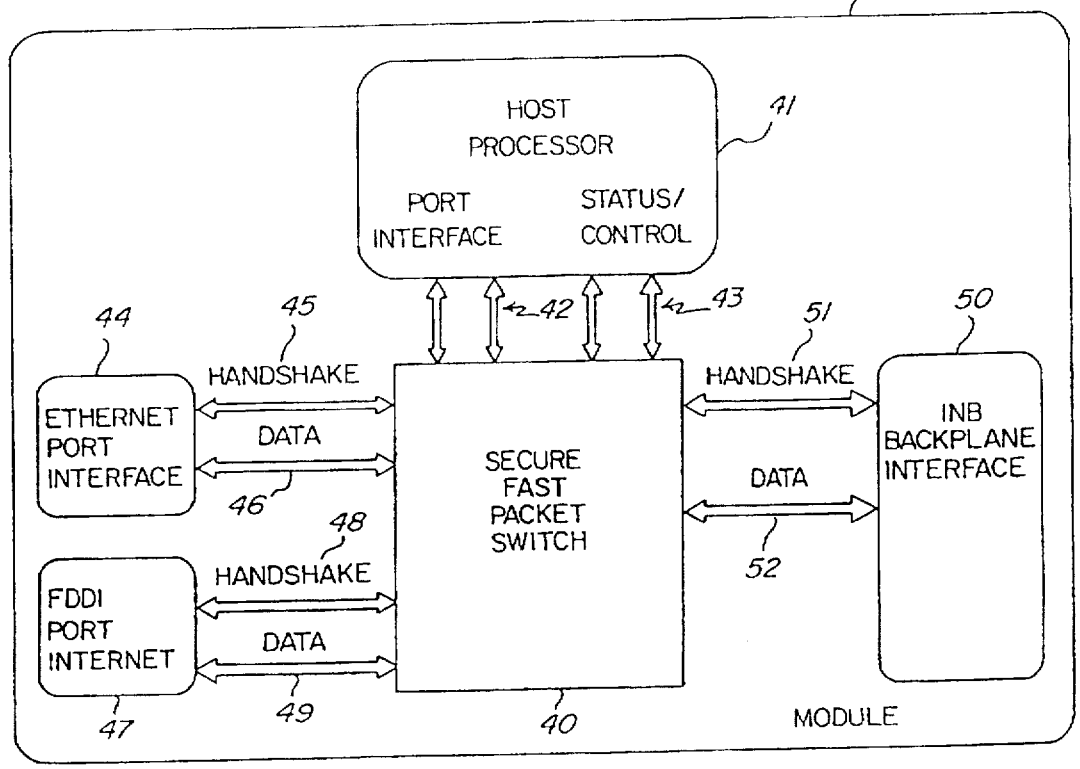
FIG. 5 is a schematic diagram of a networking module with a SFPS switch.

Each module 32 is microprocessor based, e.g., i960 sold by Intel Corporation. FIG. 5 illustrates a module embodying an SFPS switch 40 which is linked to the module's host processor 41 by a pair of port interface links 42 for transfer of data, and a pair of status/control links 43 for transfer of status and control signals. The control and status interface is viewed by the host CPU as a set of registers that control the configuration and switching policies of the SFPS, as well as allowing the host CPU access to diagnostic information and switching statistics.

The SFPS 40 provides packet switching services between network data interfaces 44, 47, and 50 according to the criteria set by the host CPU 41. The network data interface consists of a data path and several handshaking signals. By way of example, FIG. 5 shows an Ethernet interface 44 with handshake and data links 45–46, FDDI interface 47 with handshake and data links 48–49, and a backplane interface 50 (to the networking chassis backplane 33) with handshake and data links 51–52. The network data interfaces 44, 47 can be configured to handle, for example, up to 16 separate network ports, or one high speed port. The amount of bandwidth granted each network data interface is determined by the implementation of the SPFS; a specific example of programming the MPA arbiter on the SFPS is described in a later section. The SPFS handshaking signals allow the network interface block (NIB) to request use of the SPFS, as well as synchronize the transfer of data. The NIB provides translation of the original frame format to the canonical format as well as protecting the data with checksum coverage.

Figure 6:
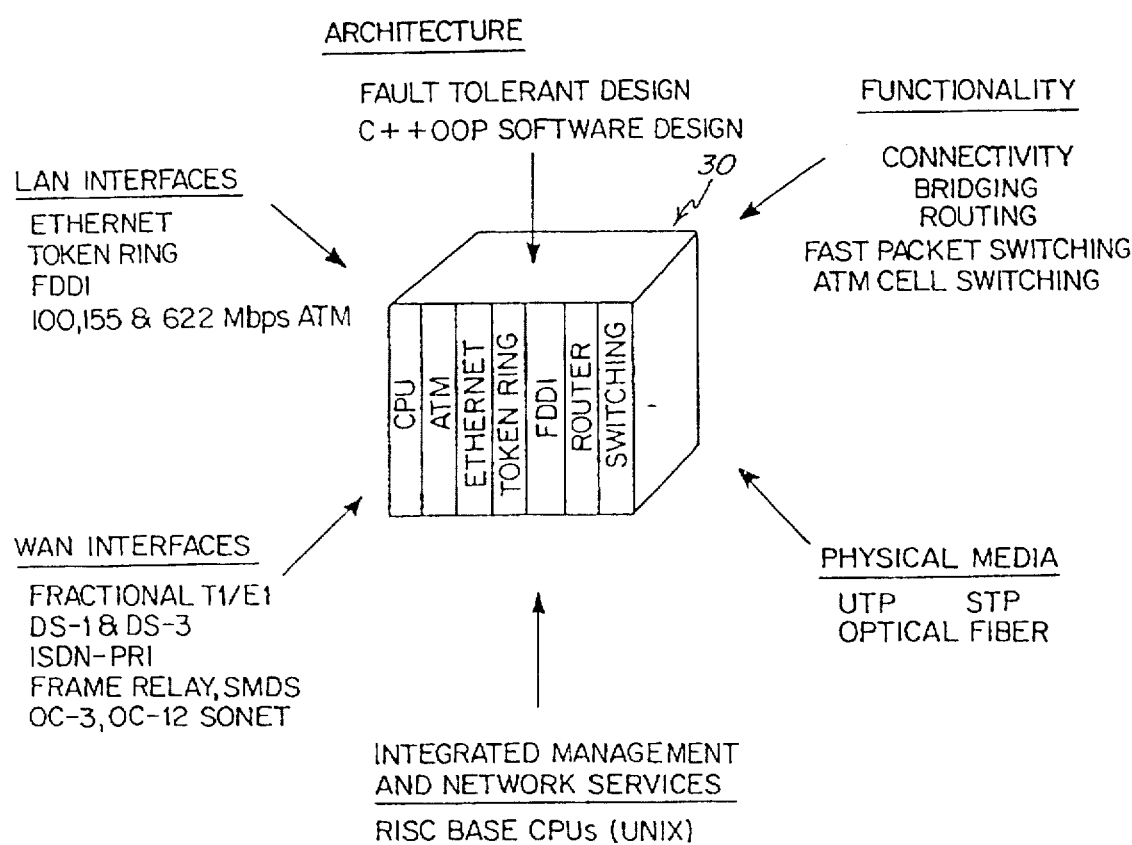
FIG. 6 is a schematic illustration of the networking chassis and the services it provides.

FIG. 6 is a schematic illustration of the various functions provided by the networking chassis or hub 30. The chassis is schematically shown in segments consisting of: CPU; ATM; Ethernet; Token Ring; FDDI; Router; Switching. The chassis architecture may be implemented in C++ OOP (object oriented programming) software. The backplane connects various LAN and WAN interfaces. An integrated management network service is provided, based on RISC base CPUs (UNIX). The physical media is UTP and STP sockets, and optical fiber. The functionality includes: connectivity; bridging; routing; secure fast packet switching; and ATM cell switching.

As previously discussed, one or more of networking modules 32 in chassis 30 may be an ATM cell switching module. Such a module would need to perform packet to ATM cell conversion (and vice versa) for transmissions between the module and the chassis backplane. Within the ATM module, ATM cell switches function much like a router in that each switch receives cells from each port and then forwards them out the correct port (Unicast) or ports (Multicast). As the cell is forwarded to a switch, its header is modified with "next switch" routing information. This process continues at each cell switch until the cell is received at the end node. End nodes then strip away the cells and deliver the data to the end user or router application. Cell switches include a management agent (CPU) that is used to set up the logical connection through the switch as well as monitor the operation and performance of the switch and its ports or links. All cell switches are built around the core switch fabric which determines its maximum performance or switching capacity. Usually, this is expressed in Gigabits-per-second (Gbps). ATM switching capacity in the one to two Gbps range are now becoming available, and switching capacities in the 20–40 Gbps range are expected within the next few years.

The above networking chassis is designed to distribute the network management services across the various networking modules, to provide increased throughput (prevent bottlenecks) and fault tolerance (i.e., there is no one networking module which if defective, shuts down the system). A system and method for implementing this distributed management is more fully described in a copending and commonly owned application U.S. Ser. No. 08/187,856, U.S. Pat. No. 5,522,842 filed on the same date (Jan. 28, 1994) entitled "Distributed Chassis Agent For Network Management," filed by Brendan Fee et al., which is hereby incorporated by reference in its entirety.

6. SFPS Functions

The "secure" feature of the SFPS means that no traffic is allowed through the switch until "programmed" by the SCS (switch agent). All end-to-end system connections passing through the switch must be validated, i.e., by way of access list, virtual LAN, policy, etc. The switches register with the SCS before becoming operational. The switches "discover" and report end systems on each port of the switch to the SCS. This allows the SCS to learn the SFPS topology without the SFPS switches having to run a distributed topology exchange protocol.

The "fast" feature of the SFPS may be accomplished on hard cards, wherein packet switching is done completely in hardware ASICS. The network interface block (NIB) handles the media interface. All NIBs translate data into a common internal frame format, i.e., the canonical format. The lookup engine extracts the key fields from the frame (i.e., MAC source and destination addresses) as the first burst of data is transferred from the NIB to packet ram. The extracted data is then "looked up" in the connection table. The lookup engine provides the search function as well as dynamic learning and aging of table entries. The search result is a code either programmed by the host CPU or learned by hardware that indicates where the frame should be forwarded based on the key fields. When the result operation is complete, the results are delivered to the forwarding engine.

Alternatively, the "fast" feature can be provided by soft cards, wherein packet switching logic is minimized. There are no hierarchical lookups or header decoding beyond the MAC address header. There is no variable length packet headers or addresses. There is no protocol type processing.

The "packet" feature of SFPS means that the switch supports existing LAN packet formats, e.g., Ethernet, Token Ring and FDDI. No segmentation or reassembly of packets is required.

The "switching" feature in SFPS means that the switch treats data flows as connections. The source port, source MAC and destination MAC become a unique tuplet which serves as a connection identifier. The switch always forwards (switches) the packet out the correct output port; there is no flooding out all ports. The switch uses an arbiter to share switch bandwidth and ports. When the network management service provides for distributed management of all modules in the networking chassis, it is possible to guarantee performance to designated users and provide varying levels of quality of service.

7. The SFPS Host Agent

Figure 7A:
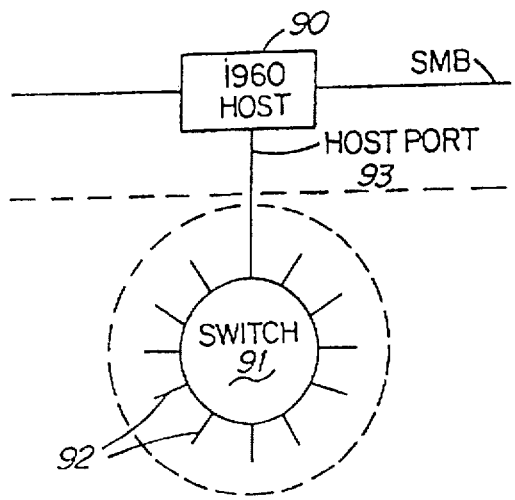
FIG. 7A is a schematic illustration of an SFPS switch.
Figure 7B:
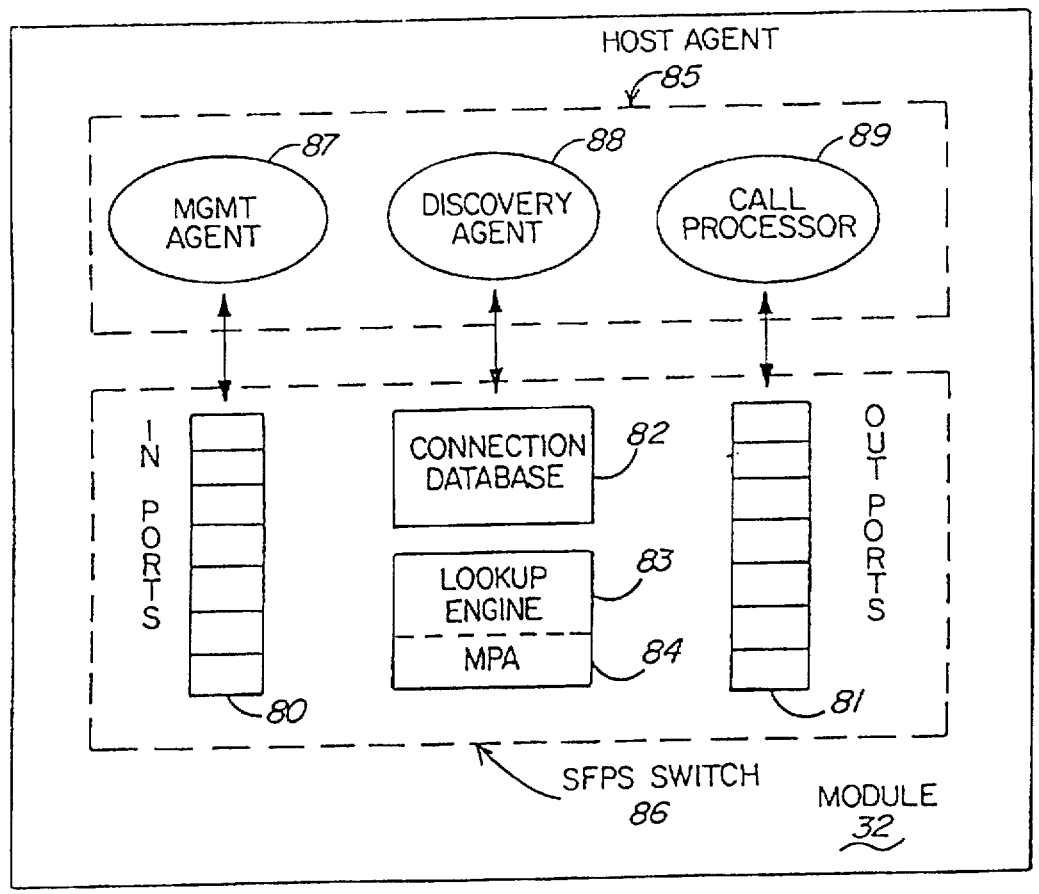
FIG. 7B is a logical view of an SFPS switch.
Figures 1, 7C:
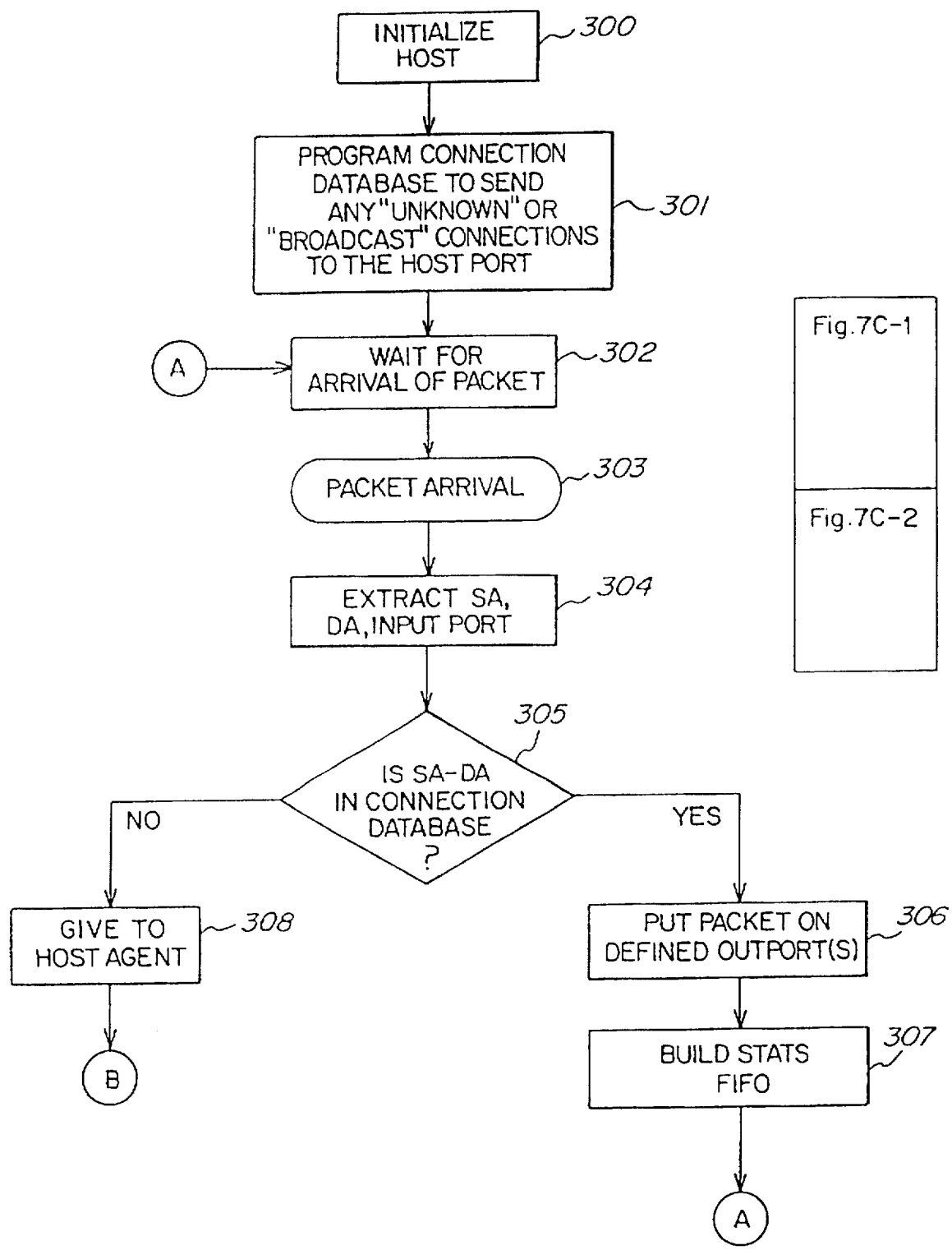
FIG. 7C is a flowchart showing processing of a data packet by an SFPS switch.
Figures 2, 7C:
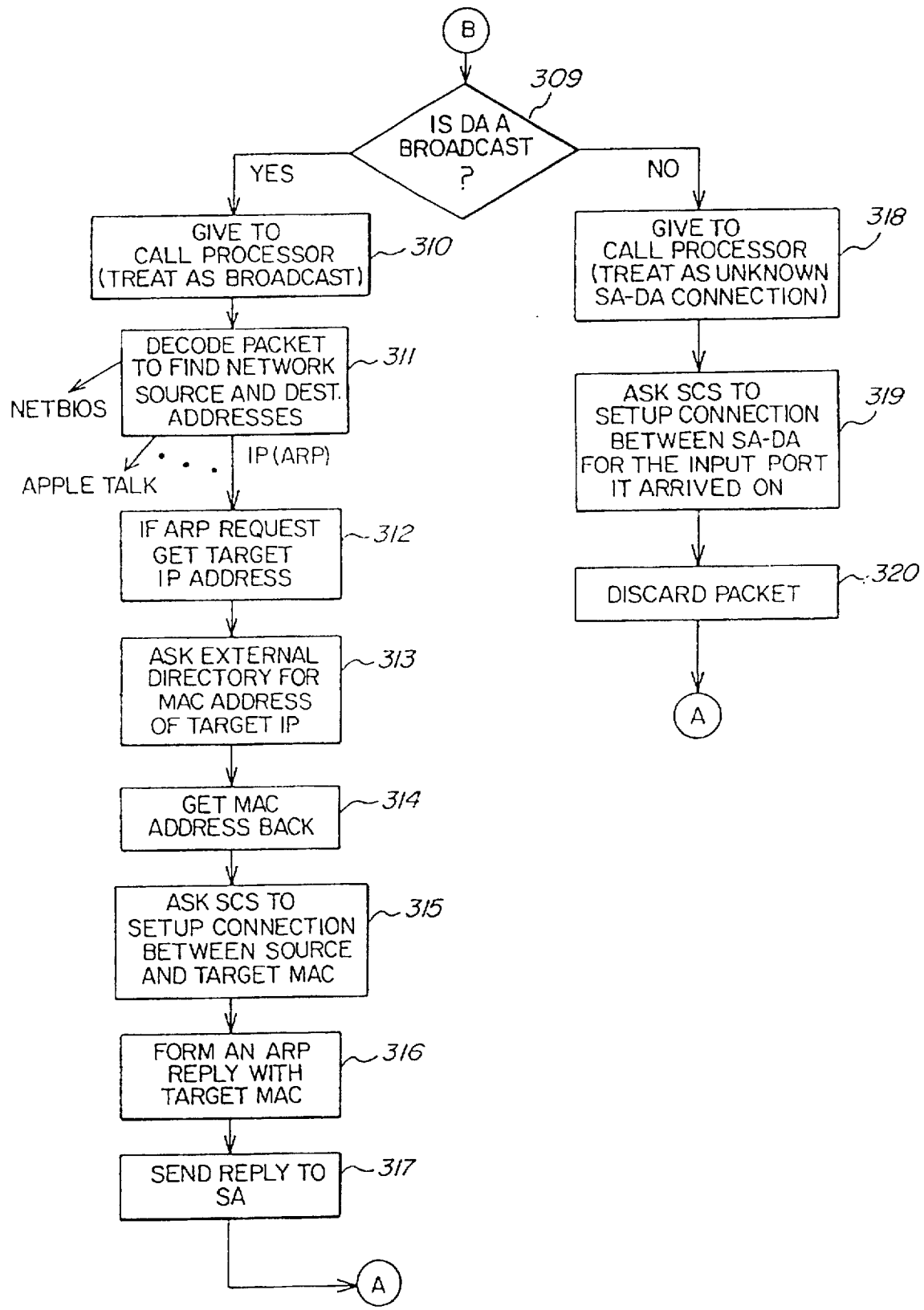

The operation of the SFPS host agent is best illustrated in FIGS. 7A–7C.

FIG. 7A is a schematic illustration of a SFPS switch 91 having a plurality of ports 92. A host port 93 connects the switch to its host CPU 90, which may be an i960 microprocessor sold by Intel Corporation. The host CPU is connected to the system management bus (SMB) for receipt and transmission of discovery and other control messages between modules in the networking chassis.

FIG. 7B–7C illustrate the internal operation of the switch. The SFPS switch 86 includes in ports 80, out ports 81, connection database 82, look-up engine 83, and a multi-level programmable arbiter MPA 84. All of these components have been previously discussed with regard to the switch shown in FIG. 2. The switch 86 sends and receives messages from the host agent 85, which includes a management agent 87, a discovery agent 88, and a call processing agent 89. The interaction of the host agent, switch, SCS and end system will be described in the following paragraphs, and is illustrated in the flow chart of FIG. 7C.

The management agent 87 provides external control of the configuration and operation of the SFPS switch, through the network management system.

The discovery agent 88 provides a mapping of end systems to switching ports through a passive listening (snooping) capability and a registering of end system addresses and port locations of the host switch with an external directory located in the SCS. Adjacent switches are also discovered and mapped, but this may be done with an explicit switch-to-switch protocol (nonpassive).

The call processor 89 provides a means for requesting connections to be established between two end systems. In the case where the source-destination MAC addresses are not in the packet frame, i.e., usually in a frame that has a broadcast—all hosts—MAC address, the call processor will decode the packet to find source or destination network addresses and will use these to map back into the mapped addresses from the external directory located in the SCS. Once the end system MACs addresses are known, the call processor will then request the connection between the end systems. If the broadcast frame was a probe or address resolution packet (i.e., an implied connect request), the call processor will return a probe reply as a "proxy" which gives the destination end system MAC addresses. Subsequently, the source end system can then send packets directly to the destination based on its MAC address.

FIG. 7C is a flow chart illustrating what happens from the time a data packet is received on an input port of the switch, until it is sent on the correct output port.

Referring to FIG. 7C, in step 300 the host is initialized. In step 301, the host programs the connection database to send any "unknown" or "broadcast" connections to the host port. In the next step 302, the switch waits for a packet to arrive. In the next step 303, a packet has arrived. In step 304, the switch extracts the source MAC address, destination MAC address, and identifies the inbound port on which the packet was received. In step 305, the look-up engine checks to see whether this source-destination pair is already located in the connection database. If it is not found in step 308, the packet is given to the host agent. The call processor and the host agent determine whether it is a broadcast destination (step 309). If the answer is yes, the call processor decodes the packet to find the network protocol source and destination addresses (steps 310–311). A different protocol decode logic would be provided for each network protocol. For example, in the IP protocol, if an ARP request is received, the call processor would get the target IP address (step 312). It would then ask the external directory (SCS) for the MAC address of the target IP (step 313). In the next step 314, the SCS sends the MAC destination address back to the call processor. In step 315, the call processor asks the SCS to set up a connection between the source MAC and destination MAC. In step 316, the call processor forms an ARP reply packet by putting the destination MAC address inside the packet. In step 317, the call processor sends a reply to the source address. It should be noted that this reply allows the source end system to update its private mapping of the destination IP address to a nonbroadcast MAC address. All subsequent packets to this destination IP address will be properly framed with the source and destination MAC address for which connections will now exist.

If the answer in step 309 is no, then the call processor treats it as an unknown connection (step 318), asks the SCS to set up the call (step 319) and discards the packet (step 320).

Returning to step 305, if the source and destination MAC pair are found in the connection database, the data packet is sent to the switch outport(s) defined in the database (step 306). In next step 307, the management agent collects statistics regarding transmissions through the switch and sends them to the SCS.

8. SFPS Distributed Switch

Similar to the manner in which management services may be distributed across the modules in the networking chassis, the SFPS functions can be "distributed" across the networking chassis.

Figure 8:
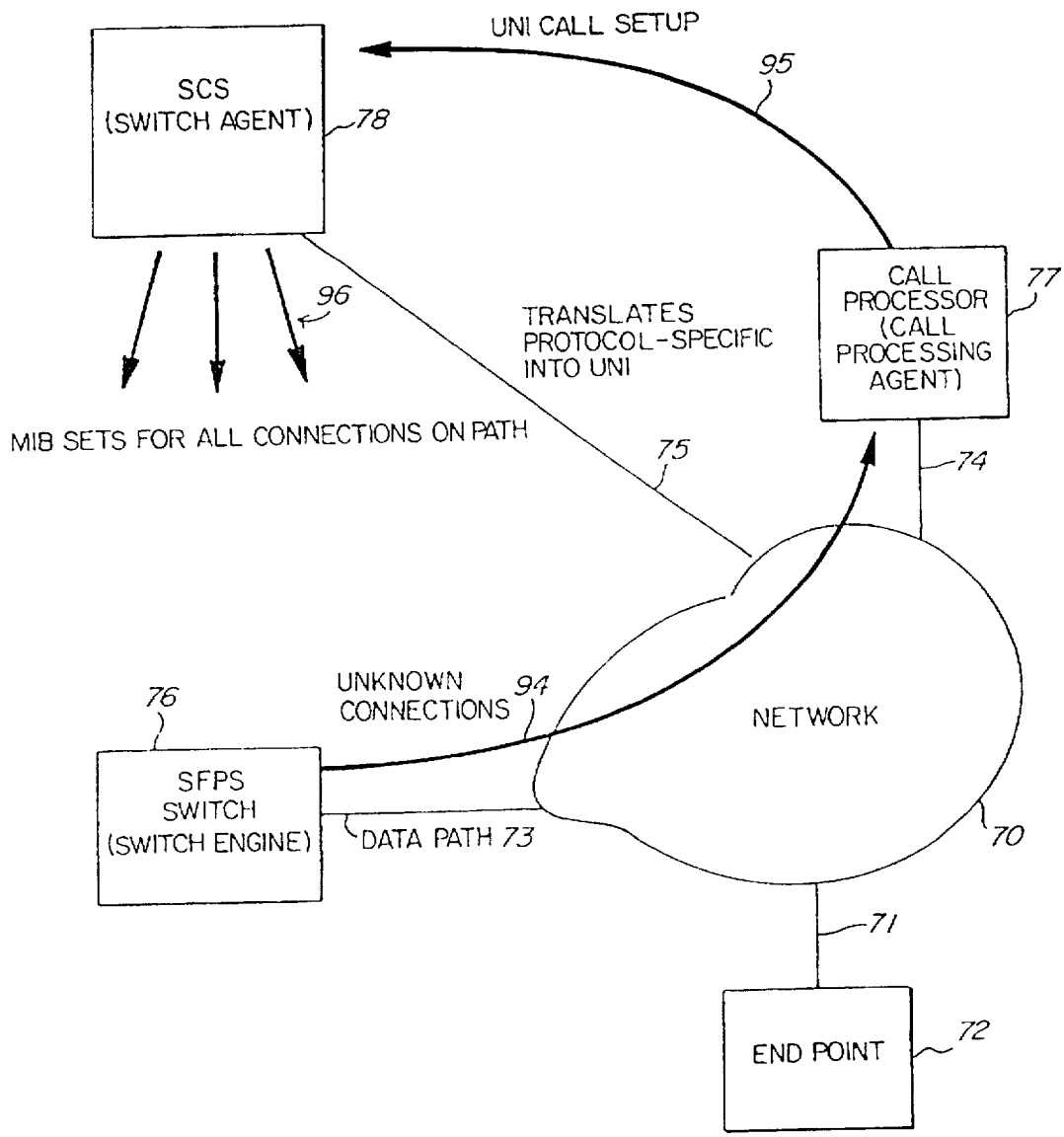
FIG. 8 is a schematic illustration of a distributed SFPS switch.

FIG. 8 is a schematic illustration of a distributed SFPS switch. A network 70 is shown schematically as a "cloud" to which there is connected by data path 71 a representative end point system 72. Data paths 73, 74, 75 connect the network 70 to an SFPS switch engine 76, call processor 77, and SCS (switch agent) 78. This is just one of many ways in which the functions of the switch may be distributed; there are many other ways. For example, the call processor may be part of a stand-alone server, part of the SCS, part of the SFPS switch, or part of the end point system. Similarly, the SCS may be physically a part of some other network component. The following is a more detailed description of the operations of the distributed switch according to the present embodiment.

8.1 Example of IP Packet Flow Through Distributed Switch

The following example illustrates IP packet flow through the distributed switch. In this example, end system A wishes to communicate with end system B according to address resolution protocol ARP. ARP is a protocol for mapping 32-bit IP addresses to 48-bit data link layer addresses, as specified in RFC 826. The SFPS switch 76 receives the broadcast and treats it as an unknown connection. It forwards the broadcast out the broadcast redirect port (programmed by SCS 78) to the call processor 77—see bold connecting arrow 94 in FIG. 8.

The call processor 77 processes the ARP request REQ packet and performs SFPS protocol to UNI (User to Network Interface) translation. It looks inside the ARP for the destination IP address. It puts the ARP request on a holding queue. It makes a directory assistance call to the SCS 78, asking for the MAC address for the destination IP address; it may provide the SCS with the switch address and source MAC address as well. Once the destination MAC address is known, the call processor 77 then tries to establish a connection from the source to the destination. It makes a CALL-REQUEST (see bold arrow 95) on behalf of the end system, but does not set up the connection from itself.

The SCS 78 then processes the call request from call processor 77. The SCS validates the call according to, i.e., policy, access control, virtual LANs, quality of service, etc. SCS 78 determines the path to connect the source and destination and then "programs" each switch in the path with a valid connection. A connection is a combination of source port, source MAC, and destination MAC mapped to an outbound port. The SCS 78 uses SNMP and switch MIBs 96 to do this; there is no signalling per se. SCS 78 returns CALL-ACCEPTED to the call processor 77.

The call processor 77 removes the ARP reguest from the queue and fills in the destination MAC address and sends an ARP response to the source end system. The source end system now has an updated ARP cache and can send packets directly to the destination end system. These packets get switched through each switch along the path as programmed by the SCS.

8.2 Distributed Switch MIB

Figure 9:
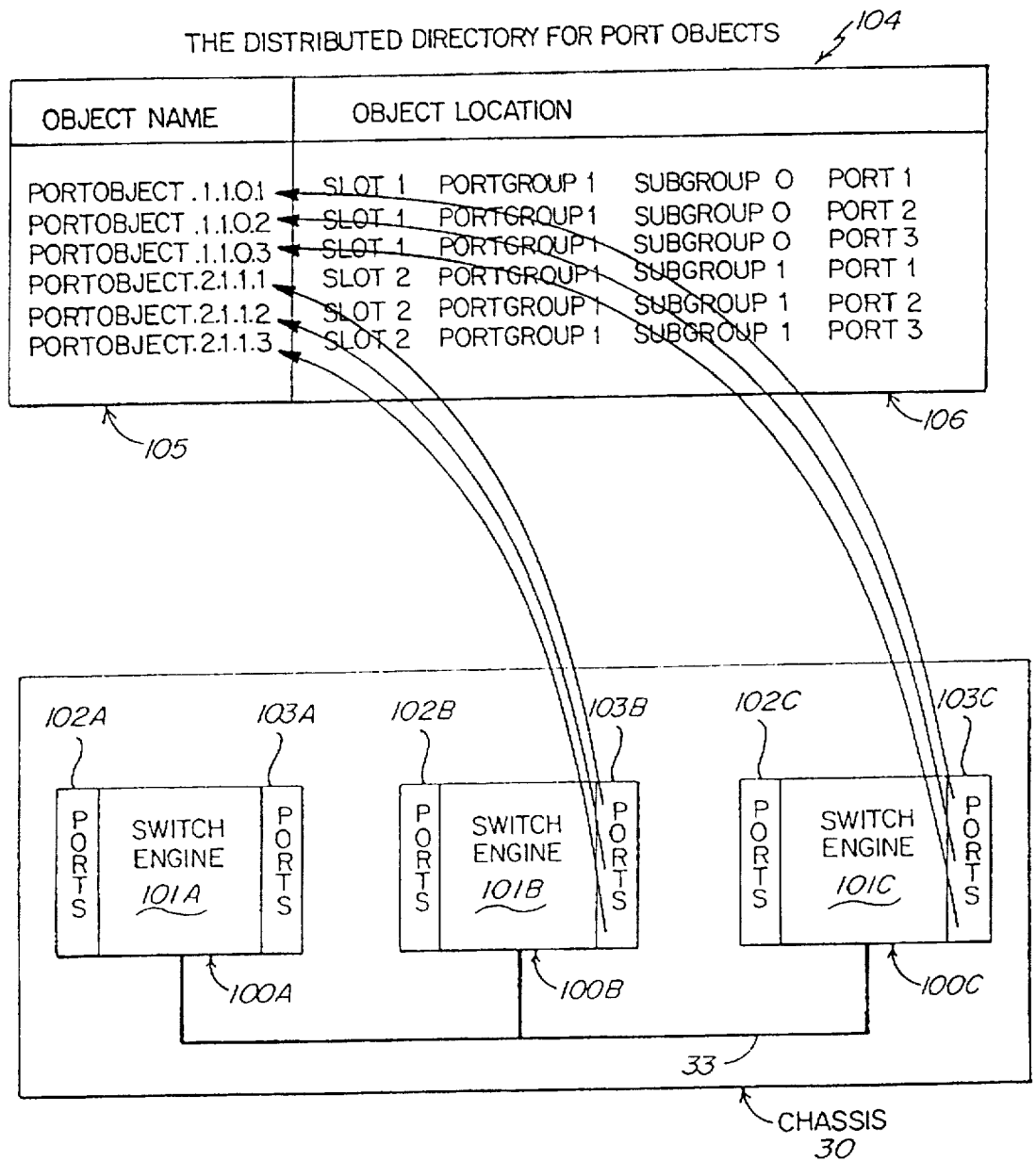
FIG. 9 is a schematic illustration of a chassis and distributed switch and illustrates the formation of a distributed directory of port objects for the distributed switch.

In the following explanation of the distributed switch MIB, FIG. 9 illustrates generally modules 100A-C, each having a switch engine 101A-C, input ports 102A-C, and output ports 103A-C, and each connected by backplane 133 of networking chassis 30. A "Distributed Directory for Port Objects" 104 is shown above which includes an object name 105 and object location 106 for each output port 103.

It is important to understand how the switch MIB becomes distributed across the networking chassis. Essentially, the MIB objects are self-distributing by design in that there are no "flat" managed objects that would need to be replicated across modules. Instead, each managed object of the switching engine is indexed by at least a module chassis/slot number and in the case of ports, by a key of chassis/slot/port. The key 106 is somewhat hidden by calling this a PortIdentifier 105 which can be specified in decimal dot notation. In conjunction with a MIB tree registration agent that distributes the name and location (think of it as a replicated directory of file names, but not the data) across each module, the MIB tree will automatically form a unique naming tree by redefining the name of an object to be its OID (Object Identifier) and its location information. This MIB tree replication is done totally transparent to the individual managed objects on each module or switch engine. What results is a replicated tree of the name and location of all switch objects and their unique instances.

In stand-alone switching systems the MIB object registration and naming will be done the same as in the distributed system except that MIB tree will not be replicated since the system itself is not a distributed system. However, the port objects will still use a complex portIdentifier to instance themselves.

Figure 10:
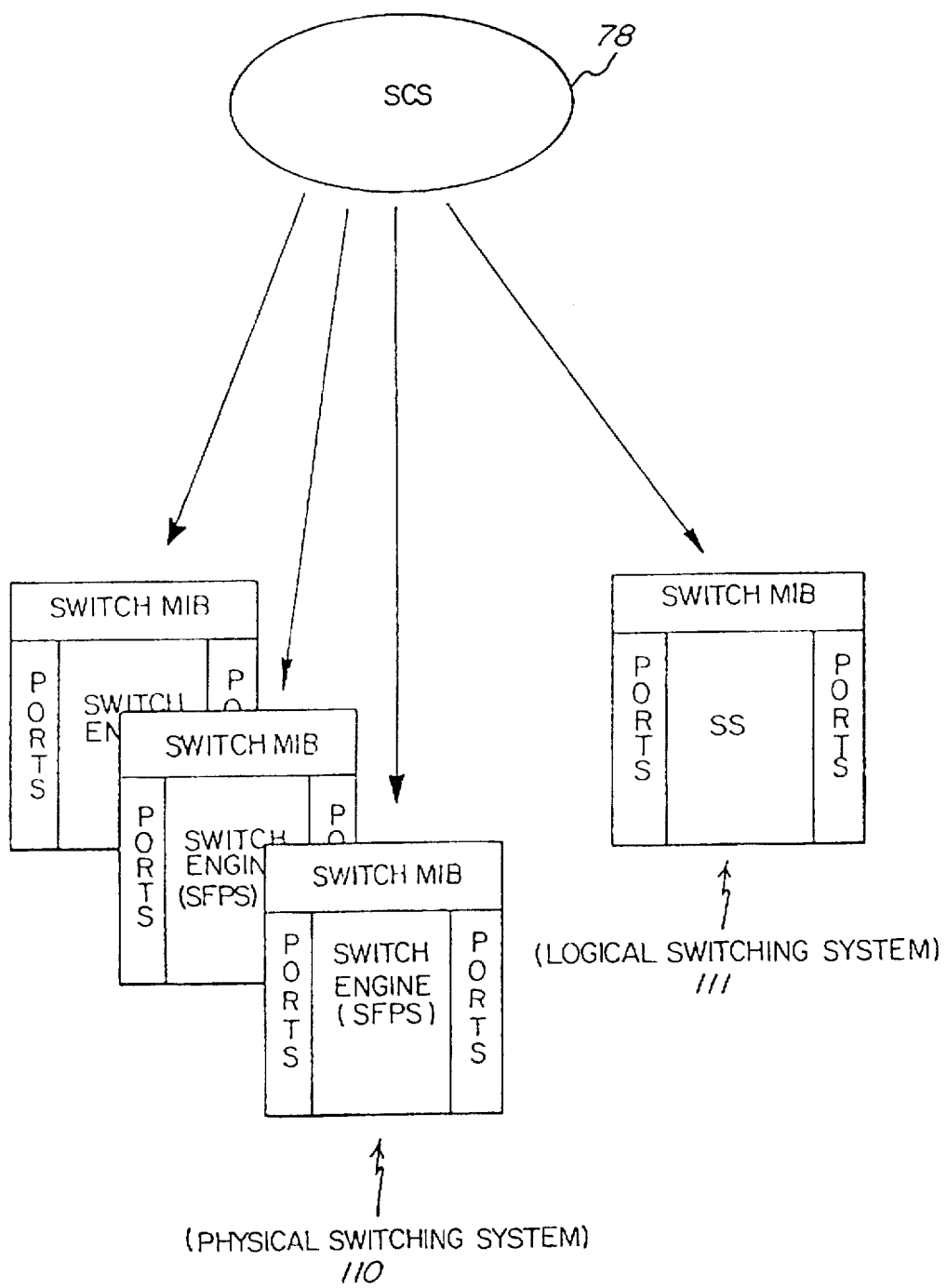
FIG. 10 is a schematic illustration of the distributed switch on the physical and logical layers.

8.2.1 The Switch MIB: Despite the fact that the Switch MIB provides a distributed view of the MIB, it does not provide a single logical view of the switching system across all of the chassis modules. This may not be apparent at first, but the Switch MIB provides for a distributed collection of switch engines that can be accessed from a single MIB view (see FIG. 10 showing SCS 78 connected to three separate switch engines on the left as the "physical switching system" 110, and connected on the right to a single "logical switching system" 111). The implications are that the SCS control agent must be able to manage and program each of the individual switch engines. For example, to obtain a connection path that had its ingress port on one module and its egress port on a different module, the SCS controller would have to program the ingress module with a separate connection going over the chassis backplane to the module with the egress port on it; the egress module would then have a connection going from the chassis backplane port to the egress port. However, this programming of each of the switches can be done through a single switch MIB and agent access point (the chassis IP/MAC address).

8.2.2 The External View: In order to provide a logical switch view, the SCS controller or management module must do this by "hiding" the internals of the individual switch engines in the chassis. The external view really reflects the abstraction of the switching engine. Basically a switch engine contains inbound ports, outbound ports, and a connection table (see FIG. 7B). Note that ports are viewed as uni-directional such that a two-way connection is explicitly defined as two separate uni-directional flows—one flow from source to destination and another as destination to source.

The external view does not provide any concept of aggregation since the external view may describe a logical switching system abstraction and not necessarily a real device.

8.2.3 The Internal View: At the individual "real" switching system, an internal view has to be provided which is different than the generalized external view. What this means is that when a real physical system (device or element) is being managed, then the MIB view can provide aggregates and other information that is not generalized for switched systems. An example is that an individual switch engine can provide aggregate counters for switched packets and for errors inside the physical switch device. It is expected that the internal view as it is called here is used when zooming in to control a very specific device or switching element.

9. Best Path Determination

One of the principal functions of the management or SCS switch agent 78 (see FIG. 8) is to determine a "best" path through the switches for a given set of metrics (see for example FIG. 1 and the accompanying text). This is important to insuring "fast" transmissions, avoiding bottlenecks (excessive traffic on the backplane), and guaranteeing quality of service (QOS). Set forth below is one preferred method for determining the best path.

The search method can be described as a concurrent breadth first path search through a mesh of nodes and arcs—see for example the network topology or mesh of FIG. 1 wherein the switch S and end point systems M would be nodes, and the links L between nodes would be arcs.

The problem to be solved is to find a path between any two points in the mesh which has the following properties. The path is optimal for one metric and passes a set of threshold tests for n other metrics. Mathematically the desired path $Q_i$ of all the paths $Q_o, \ldots, Q_z$ is the one whose value v is the best and whose values a, . . . , n all pass threshold tests A, . . . , N. Secondarily, it must do this within a minimum time constraint T.

The method assumes an initial set of values and accumulates additional values following the traversal of all nodes and arcs along a path until the path arrives at the destination or goal node. The method was developed to satisfy the requirements of ATM route determination. ATM (asynchronous transfer mode) is a new CCITT networking technology. The problem is simply to find an optimal path through a mesh which satisfies a number of independent constraints. The solution would be applicable in general to: any routing problem in a mesh network such as a communication network and/or in electrical and electronic circuit design; a distribution of power; a distribution via pipelines; traffic routing over streets and highways; etc.

The method, which is illustrated in the flow chart, data structures and example of FIGS. 11–13, will first be described generally.

As paths are expanded during a discovery process, (n+1) metrics are altered in a monotonically increasing or decreasing function. This is what makes the metrics useful. Since some metrics increase or remain the same for each traversal and some decrease or remain the same, it is confusing to describe them in terms such as larger, smaller, etc. Therefore, we will use the terms best, better, worse, and worst. For example, a cost metric can be best when it is 0 and worst when it is some maximum positive value. Probability, on the other hand, is best when it is 1 and worst when it is 0. A metric which is measured in absolute value (i.e., Impulse fct) would be best at 0 or infinity depending upon your viewpoint (i.e., is the impulse desirable or undesirable). At initiation there is a vector of metrics which is applied at the source node. At each traversal of a node or arc this vector of values is modified and produces a traversal value which accumulates from a best state to a worst state.

The method is a breadth first recursive search in parallel. It is initiated at a source node with an initial set of values and proceeds until there are no further paths to explore. It starts with a list of all the neighbors (neighboring nodes) of the source node. It then processes that list producing another list of all the neighbors of neighbors, etc. It uses several methods of "pruning" to keep the number of potential paths explored from growing towards infinity. A significant feature of this method is the pruning steps.

As each node is discovered, a traversal value vector is recorded for that node. Each time the destination node is discovered, the traversal value vector is recorded.

When a path discovers a node already within the path, it terminates itself. This prevents cycles and prevents infinite loops. If a path discovers that its traversal value vector is not best in any of the (n+1) metrics, it terminates itself. When a path traversal value vector has no metric which is better than one of the already completed paths, it terminates itself. Any path which would traverse a disabled arc or node, terminates itself. Any paths whose traversal value vector fails the filters (threshold value) in any metric, terminates itself. Any path which encounters an end node (i.e., a node which does not forward traffic, but may be a source or sink for traffic) which is not the destination node, terminates itself.

For each successive traversal list, all the paths going to a single node are grouped together before processing. Any of these paths which is not better than the others in at least one metric is terminated.

With the above pruning steps, only paths which can potentially produce a best result in some metric are allowed to proceed towards the destination. If a filter should knock out a promising path, the less promising paths will not be blocked as they are in Djikstra (i.e., Djikstra's short path algorithm with filtering). If any path can successfully pass the filters, it will get through since all paths which are best at something are allowed to continue.

Once there are no more paths to process, all the successful paths are scanned selecting the path which best fits the desired result for presentation as the final answer.

The above steps comprise the most agressive pruning; a subset of these steps may be used for less aggressive pruning.

9.1 Example of Best Path Determination

This specific method was developed for wide area networks (WAN) which have a large number of diverse and redundant paths. It is a breadth-first search, which means it proceeds in rings moving outwardly from the source node (see rings 234A, 234B, 234C, etc. in FIG. 13 moving outwardly from source node 1), in order to build a spanning tree. Based on the time-constraint and metrics chosen, the farther one goes across the mesh, i.e., the farther away from source node 1, the higher the probability that one will reach a worst case (i.e., a filter threshold). The metrics progress monotonically toward a worst case. The algorithm is designed to proceed toward multiple destination nodes at the same time, and to save more than one path in cache memory so that if a first path becomes unavailable, a second path is readily available in the cache. At the same time, the method utilizes a number of a "pruning" steps or "chokes" for eliminating low probability paths, i.e., subpaths which are not likely to produce the best path. The chokes prevent excessive use of memory space and processing delays which would be required if every possible path were saved. The amount of pruning applied can be varied as follows:

"aggressive" means a traversal value is better in at least one metric;

"moderate" means a traversal value is better or equal in at least one metric; and "light" means a traversal value is better, equal or above some threshold level in at least one metric; this is used in cases where there is little redundancy in the mesh, so that one can save multiple values in cache.

In addition to providing chokes (i.e., pruning mechanisms), the method provides "grouping" such that all values and paths for the next traversal are stored together and processed together as a "computational unit." This second feature is also important in satisfying the time constraint. The significance of the chokes and grouping is exemplified by the following example. A source code written in "Python" (i.e., an interpretive prototyping language) according to the flow chart of FIG. 11, but without the chokes and grouping, provided a search time of about 115 seconds. Adding the chokes reduced the search time to 40 seconds. Adding the chokes and grouping reduced the time to one second—a 115 time increase in performance. When written in C++ language, the one second search time is expected to translate into a ten millisecond performance time—well within the desired time constraint.

9.2 Data Structures

Global Object_Vector[O]. A vector of object instances which is a property of the Routing Object itself and is created when the Routing Object is first initialized. Each Object in the Object Vector is the implementation of a metric object.

Global Node Values [N][Q][V]. A two-dimensional array of metric value vectors. There is a vector for each combination of node index and qos index that are defined for the Routing Object.

Global Arc Values [A][V]. A one-dimensional array of metric value vectors. There is a vector for each arc in the Routing Object.

Global Adjacency [N]. A one-dimensional array (i.e. a vector) of lists. Each list represents the adjacencies of the corresponding node. Each adjacency is a tuple of the neighboring node and the arc between them. A node may appear in multiple adjacencies for the same neighbor but must have a different arc index for each appearance. Each arc index will appear twice in the Adjacency structure, once for each terminating end point.

Local PtrSpace, New PtrSpace. Each is an array of records. Each record has 3 fields. The Parentfld contains the index of the parent of this family of traversals. The Pptr contains the pointer within this array of the next parent and is maintained in index order of parents. The Vptr contains the index of the first value associated with this parent in the ValueSpace or New ValueSpace arrays.

Local ValueSpace, New ValueSpace. Each is an array of records. Each record has 3 fields. The Valuefld contains the metric value vector of the aggregate values to this point in the traversals. The Vptr contains the index within this array of the next metric value vector for the parent family of traversals. The Pathptr contains the index into the PathSpace/NewPathSpace array for the first path of this value vector.

Local PathSpace, New PathSpace. Each is an array of records. Each record has 2 fields. The Pathfld contains the path to this point for the traversals. The Npptr contains the index within this array of the next path for this value vector. A Path is a list of lists. The first list is a sequence of node indices in the order of visits during the traversal. The second list is a sequence of arc indices in the order of visits during the traversal.

Local Workhead, New Wrkhead Integer. The index within PtrSpace/NewPtrSpace of the fist parent within a ring or the next to be processed in a ring. Workhead, PtrSpace, ValueSpace, and PathSpace is the current concentric ring of traversals that is being processed and New Wrkhead, New PtrSpace, New ValueSpace, and New PathSpace are the next ring to be worked on. We build the next ring while we are processing the current ring.

Local Output. Output is an array of records. The first field of each record is a completed path from source to goal. The second record is the aggregate values for that path. Thus, each entry in Output is a completed path.

Local Best Value is a tuple of metric values. The first is the best primary value of a complete path seen to this point in the processing. The second is the best secondary value seen to this point in the processing.

All Value Vectors are in the same order as defined by the objects in Object_Vector AND ARE NOT necessarily in the same order as their owning objects within Object_Vector. Their position is established when the metric objects are initialized.

Route Path has the following formal parameters: Source, Goal, Primary ValueIndex, Secondary ValueIndex, Initial_ Values, QOS, Filters and Returns a vector: exception, path, values.

Parameter Source Integer. The source node index of the path.

Parameter Goals List of Integers. The destination node indices of the possible paths. It may be a single node or multiple-nodes.

Parameter PrimaryMetricIndex Integer. The index within Object-Vector of the metric object for which this path is to be optimal.

Parameter SecondaryMetricIndex Integer. The index within Object_Vector of the metric object which is the second precedence for optimization of this path.

Parameter InitialValue Vector of Metric Values. These are the assigned metric values for this path. If this call to the Routing Object is in isolation of all other calls, this should be a vector of best values. However, if this call is made in conjunction with other calls to establish a path across multiple domains, this value will be a value returned from a preceding call to this Routing Object or another which represents an adjacent domain.

Parameter QOS Integer. This is the index for the QOS desired for this path.

Parameter Filters Sequence of tuples. Each tuple has an index for a metric object within Object Vector and an aggregate threshold value for that metric object. For example, when cost is the metric object and it has an index of 4 within Object Vector, (4,40) means reject all paths whose cost is equal to or exceeds 40.

Return Parameter Exception Enumerated Integer. 0 is a successful path. 1 is a successful call which determined that no path from source to destination met the constraints. Any other value indicates failure, the most common value being 3 which is an incorrect or inconsistent value for a formal parameter.

Return Parameter Path. A list of arc indices in order of traversal from source to goal.

Return Parameter Values. A vector of metric values which represents the aggregate of the InitialValues and all Node and Arc Traversals within the path up to but not including traversal of the goal node.

9.3 Flow Chart

Figure 11A:
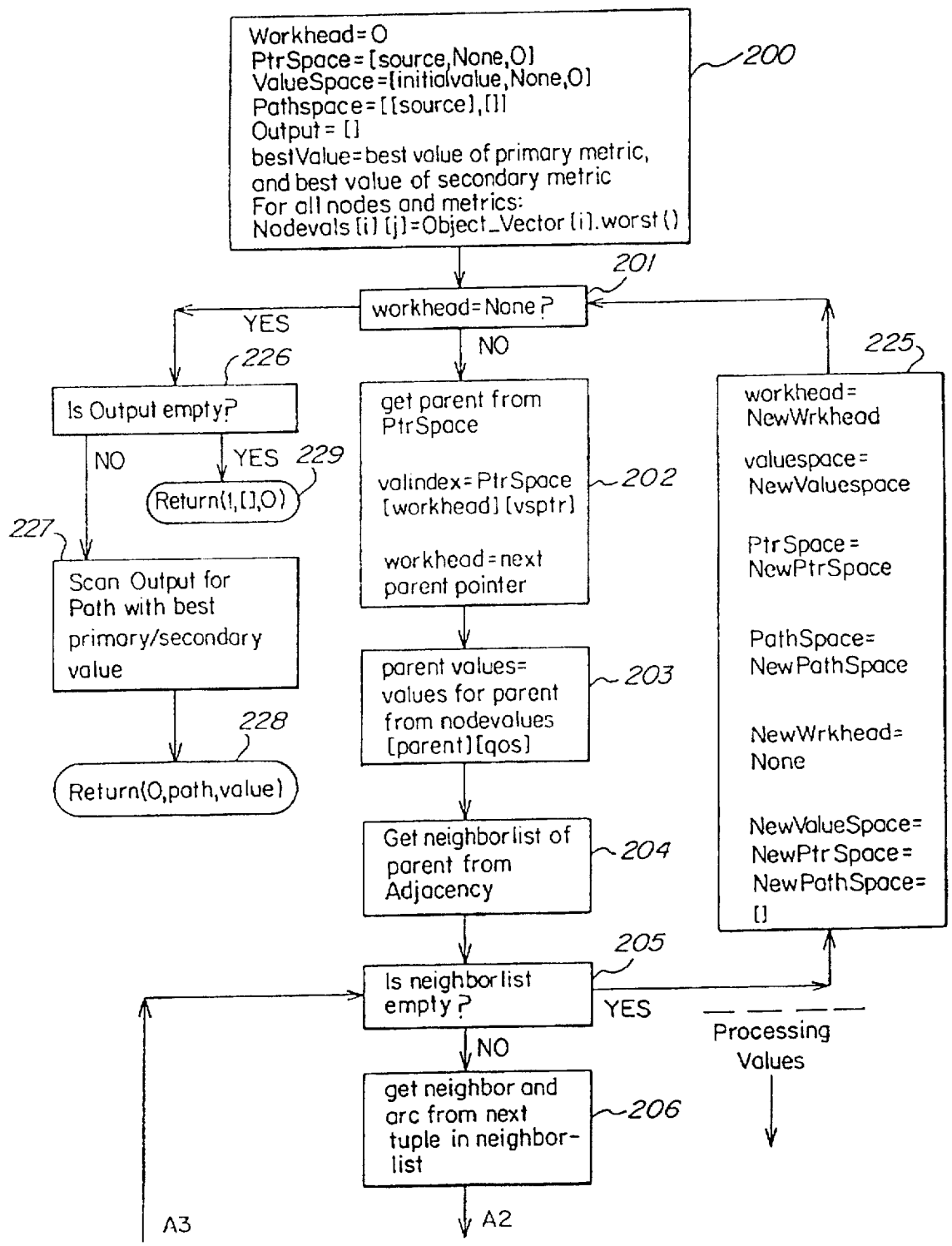
FIG. 11 is a flowchart illustrating a best path determination.
Figure 11B:
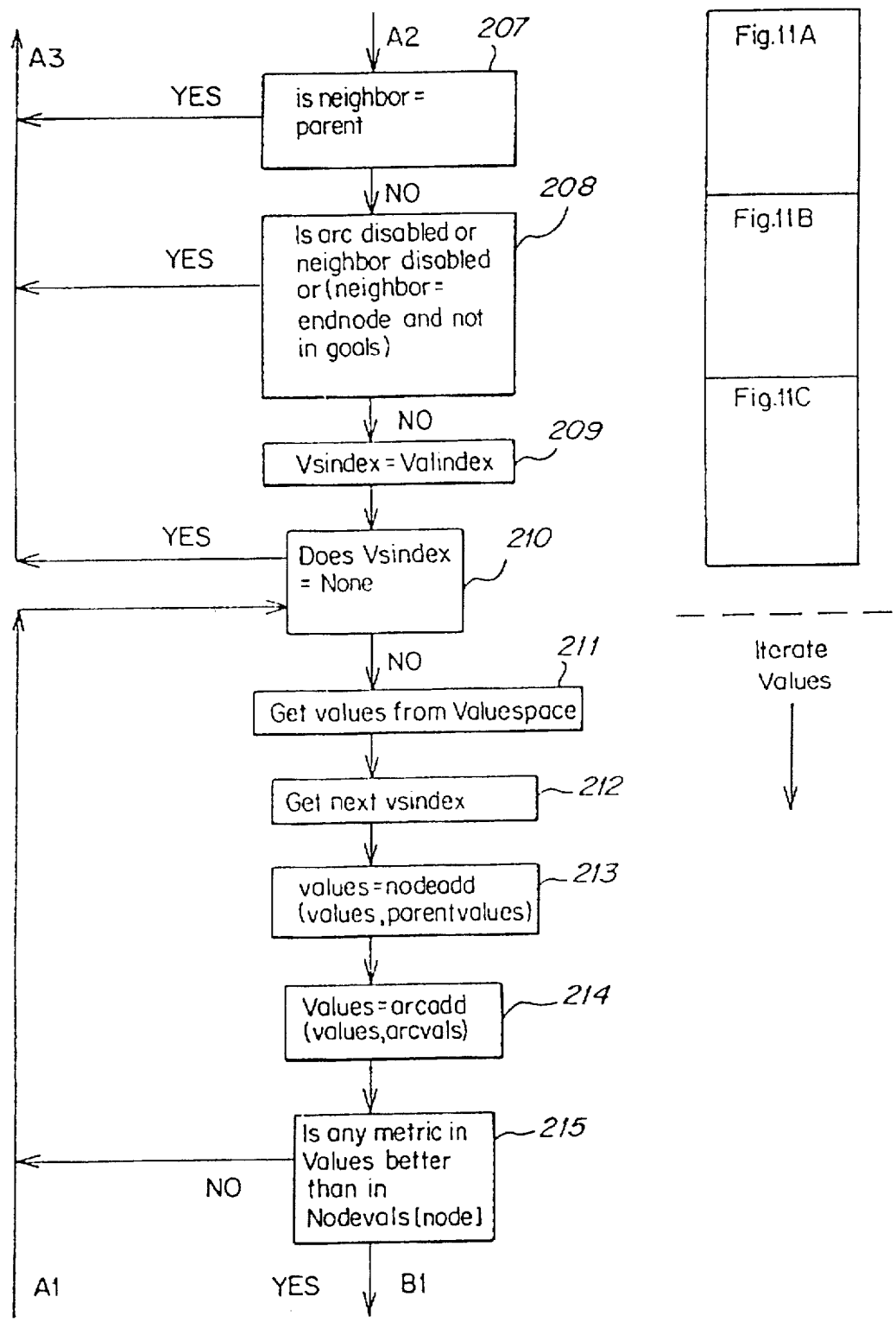
Figure 11C:
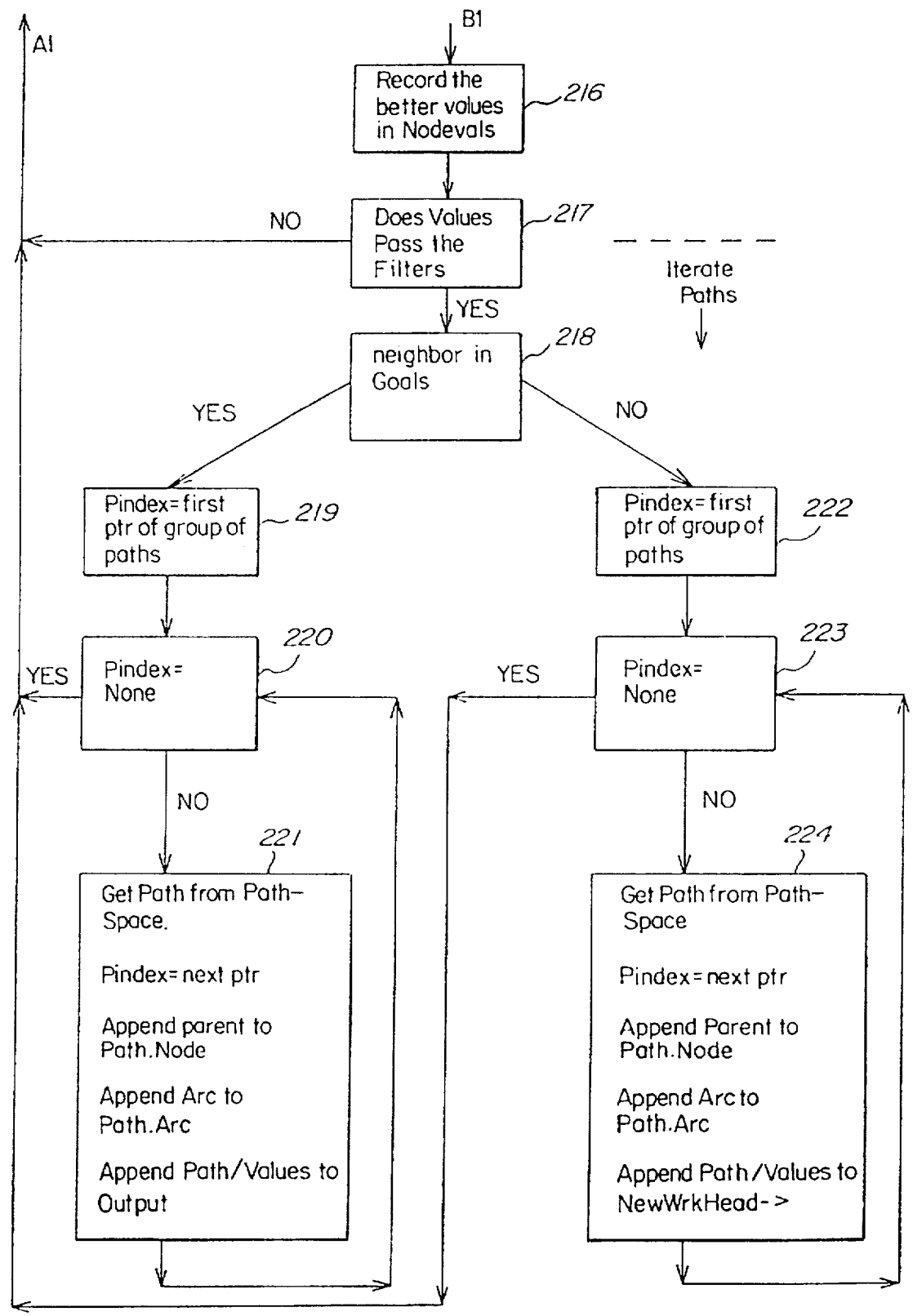
Figure 12:
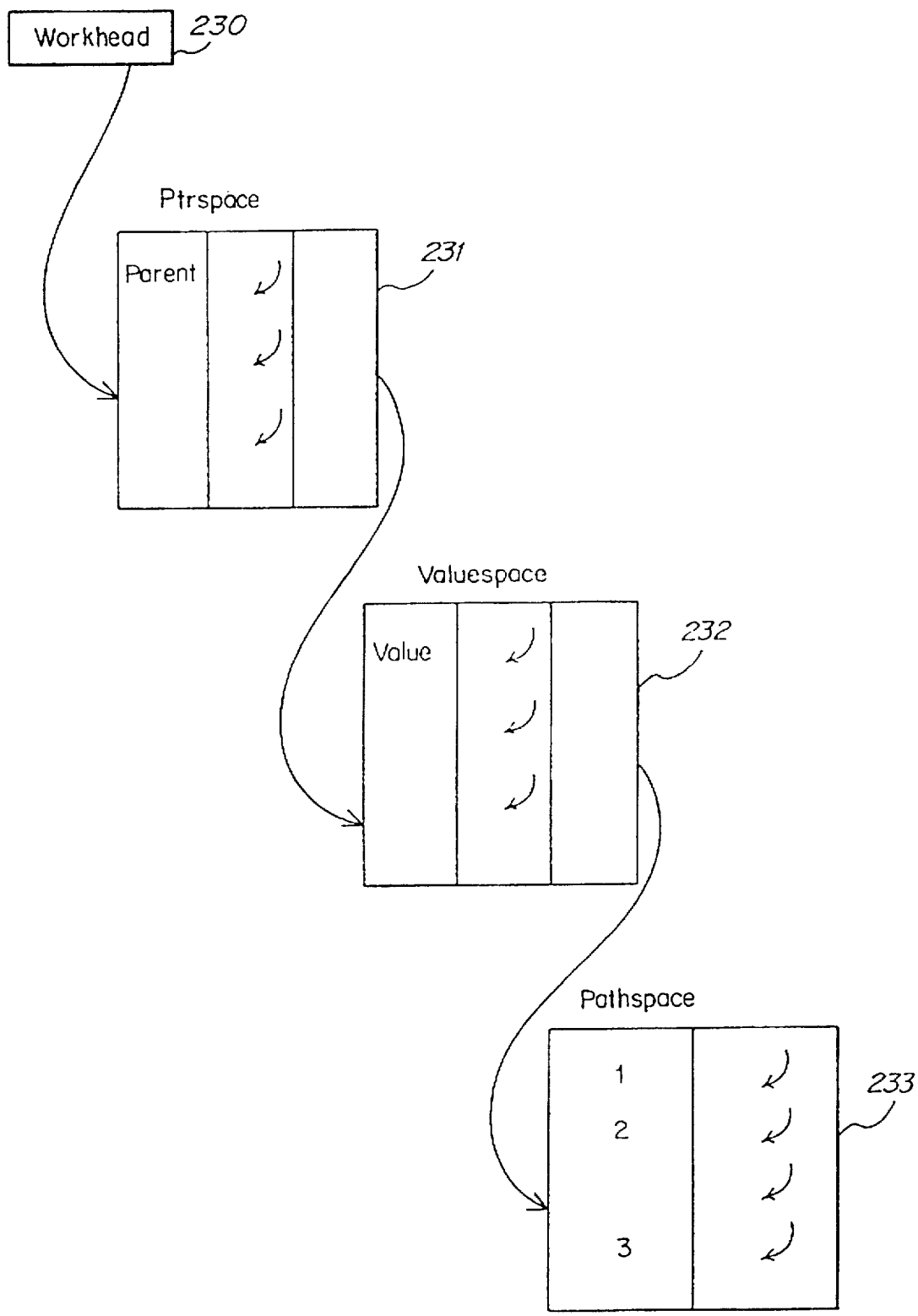
FIG. 12 is a schematic illustration of certain linked data structures used in the method of FIG. 11.

Referring to FIG. 11, step 200 is an initialization of the values, wherein "source" refers to the source node address, "goals" refers to the one or more destination node addresses. "pindex" refers to the primary metric, and "sindex" refers to the secondary metric which is used to select the best path if the primary metrics for two paths are equal. The "initial_value" is a vector of all initial values for the metrics which may come from the management system. In a wide area network where there may be a plurality of management systems managing different areas in the network, the best path determination may proceed from one sub-area to another and the initial values may come from the best path determination of an adjacent sub-area. If this is the first system to determine the best path, then the initial values will be the best values of the metrics. The "QOS" defines the quality of service for the various types of transmissions, such as voice, video or data, and provides static filters which do not change over time. The "filters" are dynamic filters such as call blocking probability, peak cell rate, etc., which are required to change over time.

Following initialization, the method proceeds to step 201 wherein the value of the data structure "Workhead" is checked. As shown in FIG. 12, the data structure's Workhead 230, Ptrspace 231, Valuespace 232 and PathSpace 233 form a chain of linked data structures, each with an array of records. PtrSpace and ValueSpace each have three fields, while in PathSpace each record has two fields. These linked data structures illustrate how the values and paths for the next traversal are stored and processed together as a computational unit.

During the first traversal, the Workhead will not be "none" and we proceed to step 202 wherein we obtain the value of parent (the next node) from PtrSpace. At this time we also set the Workhead equal to the next parent pointer, to get ready for the next traversal. We proceed to step 203, wherein the Parentvalues are set equal to the values for the parent from the Nodevalues. The Nodevalues are the values of the metrics of that node. Proceeding to step 204, we get the "Neighborlist" of adjacent nodes to the parent. Proceeding to step 205, we check whether the Neighborlist is empty, and if not, we proceed to step 206 to get the next neighbor (node) and arc from the next tuple in the Neighborlist. During this next portion of the flow chart from steps 206 to 210, we are processing the values. We then proceed to step 207 to check if the neighbor node is the same as the parent; if so, we do not need to check this path (it has already been traversed) and we terminate it (this is one of the chokes). Next at step 208 we check to see if the arc or neighbor is disabled or if we have reached an end node which is not one of our goals, in which case we would terminate (i.e., another choke). We then proceed to steps 209 and 210 to check the value of the secondary metric. We now enter a new portion of the flow chart from steps 211 to 217 where we iterate the values. At step 211, we get the values from the data structure ValueSpace (232 in FIG. 12) and proceed through steps 213–215 to determine if there is any metric in Values which is better than in Nodevalues, i.e. the values of the metrics up to that node. If this is not a better path in any one metric, then we terminate the path. If not, we proceed with step 216 to record the better values into Nodevalues, and proceed to step 217 to determine whether the Nodevalues pass the threshold filters for each of the metrics. If they do, we proceed to step 218 and now enter the portion of the flow chart where we iterate the paths. In step 218, we first check to see whether we have reached the destination node. If we have, we proceed to steps 219 and 220 to check whether the primary metric is the best compared to all previous paths. If not, we terminate the path. If it is, we proceed to step 221 to output the path as the best path determination.

Returning back to step 218, if we have not reached the destination node, we proceed to steps 222–223 to check whether this path has produced the best value for the primary metrics and then proceed to step 224 to proceed onto the next Workhead.

Returning to step 225, we initialize a new traversal. If we have reached the end of our traversals and there is no path which meets all of the constraints, we proceed through steps 226 and 229 to report that no path has been found. Alternatively, if we have a successful result we proceed to steps 226–228 and record the best path.

Figure 13:
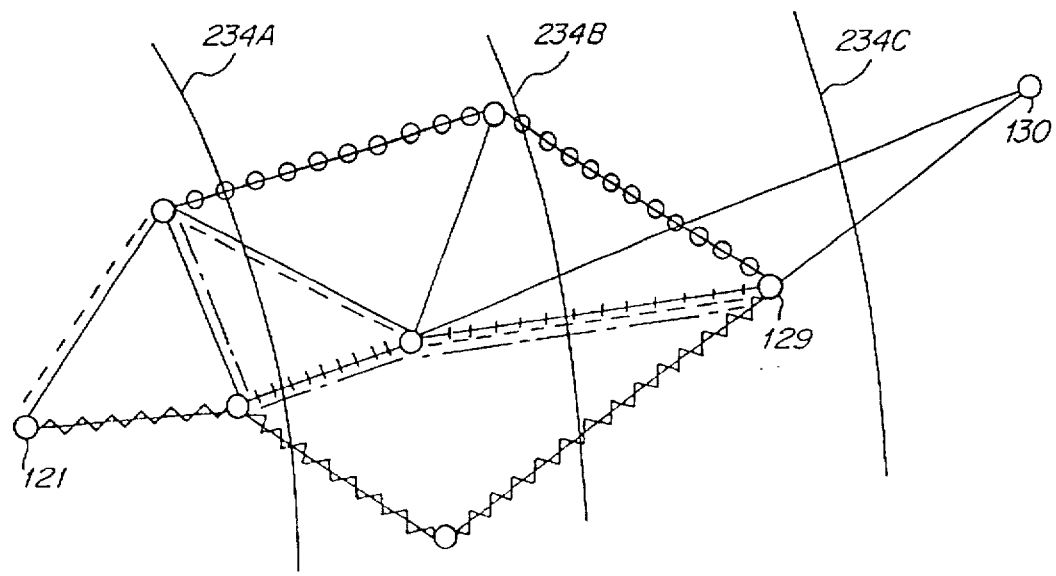
FIG. 13 is a sample network topology illustrating a traversal from a source node to destination node.

FIG. 13 illustrates a series of traversals from source node 121 to destination node 130. The search proceeds in concurrent rings as illustrated by 234A, 234B, 234C, etc. The various dashed and dotted lines show different paths from source node 121 to intermediate node 129. In this case, the traversal of the nodes 121–129 can have six paths, and three paths have been found to arrive at node 129 with equal values. In this case, we would not need to check the individual metrics of each of the three paths with the next traversal to node 130, since they are all equal; rather, we can simply check the next traversal against the metrics of one path. This time savings is enabled by the grouping of values and paths in the linked data structures shown in FIG. 12.

10. Allocation of Bandwidth

10.1 Discussion of the Related Art

In computer networks and controllers, sharing of bandwidth-limited resources is commonly required. Bandwidth-limited resources may be hardware or software resources. Examples of bandwidth-limited, shared hardware resources are peripheral devices such as printers, scanners, memories, disk drives and backplane communication links. Backplane communications links are used to connect modules in a device, such as a computer, a network controller, or a network hub such as a bridge or a router. Examples of bandwidth-limited, shared software resources are processes such as compression/decompression algorithms, and memory access algorithms. These resources are referred to as bandwidth-limited because their bandwidth limits the rate at which data can be transferred to, from, or by the resource. Within this disclosure, the term bandwidth-limited, shared resource is meant to refer to a device or process having a bandwidth limit that determines the rate of transfer of data.

In a system such as a local area network bridge or router, a number of modules are contained in a chassis. Each of the modules has one or more ports to which may be connected users or other network segments. The modules are connected together via a backplane communication link over which data is transferred from one module to another resulting in the data being transferred from one port on one module to a port on another module. This backplane communication link, although typically having a high bandwidth and resulting high rate of data transfer (typically from several hundred megabits per second to several gigabits per second), is the limiting factor in determining how quickly data is transferred from one port on one module to another port on another module, because the backplane communication link can serve only one port at a time.

To ensure that all of the ports connected to the networking chassis have access to the backplane communication link, some type of arbitration is typically employed. Each of the ports on a module connected to the networking chassis may be considered a "competing device" that competes, along with all of the other ports connected to the networking chassis for access to the backplane communication link. Within this disclosure, the term "competing device" is meant to refer generally to any type of hardware device, software process, or firmware, or application program that is to make use of a bandwidth-limited, shared resource.

One approach to arbitrate between the competing devices has been to provide what is known as time division multiplexing (TDM). In a TDM arbiter, a time segment is determined. A time segment is a unit of time, typically fixed, during which a competing device would be allowed exclusive use of the bandwidth-limited, shared resource. One time segment is assigned for each competing device. If there were ten competing devices, then there would be ten time segments. Each of the competing devices is then assigned to one of the available time segments. This information is then used by a state machine that increments through each time segment to allow the particular competing device assigned to that segment to use the backplane communication link for its assigned time segment. After the state machine has stepped through all ten devices, the process loops back to the first segment and begins again. This results in each competing device being able to use one-tenth of the available bandwidth of the bandwidth-limited, shared resource.

In a TDM arbiter, the users of each time segment are fixed. For example, the first segment is always assigned to a particular port on the network chassis and the ninth segment is assigned to another particular port on the networking chassis. One of the problems with this type of arbiter is that if the port that is allocated to a time segment is not requesting use of the backplane communication link at the time the TDM arbiter allows it to do so, then that time segment will be wasted and the backplane communication link is idle during the assigned segment.

Another way to allocate the time segments of a bandwidth-limited, shared resource such as a backplane communications link is to use a so-called "Round-Robin" arbitration system. In a Round-Robin system, a list of the competing devices is compiled and stored. An allocation token allowing exclusive use of the backplane communications link is then passed among the list of competing devices, for example, in a sequential manner. By applying sets of rules to the allocation token, the token can be passed to a device that is not necessarily the next device in the list, thus allowing for some prioritizing of allocation among competing devices. The competing device that is in possession of the allocation token is then allowed to use the backplane communication link for a particular time period. One problem with this type of arbitration system is that if the device in possession of the allocation token does not require use of the backplane communication link, the backplane communication link is unused and idle for the particular time segment.

Other types of fixed allocation systems may be used that determine, at the beginning of a particular time segment, which competing device is to be allowed exclusive access to the backplane communication system. One problem with fixed allocation systems is that the arbitration requires a portion of the time segment to determine which competing device should use that particular time segment. Therefore, the rate at which data can be transmitted across the backplane communications link is reduced because a portion of the time segment must be used to perform arbitration.

Another disadvantage of the TDM and Round-Robin arbiters is that the latency of transmission of, for example, a data packet, may be increased due to the wasted time segments. That is, although a data packet from a particular port may be waiting and ready for transmission across the backplane communication link, the data packet cannot be transmitted until the TDM arbiter allows the port access to the backplane communication link or the Round-Robin token is allocated to the port.

Therefore, an object of the present invention is to provide a method and apparatus for arbitrating access to a bandwidth-limited, shared resource in a manner that improves latency through a bandwidth-limited resource.

Another object of the present invention is to provide a method and apparatus for accessing bandwidth-limited, shared resources that allows the bandwidth-limited resource to be used whenever there is a competing device requesting access to the bandwidth-limited resource.

Another object of the present invention is to provide a method and apparatus that allows a bandwidth-limited resource to service competing devices that have a total aggregate bandwidth greater than the bandwidth of the bandwidth-limited, shared resource.

Another object of the present invention is to guarantee different quality of services to different competing devices depending upon priorities of the competing devices.

10.2 New Apparatus And Method For Allocating Bandwidth

For purposes of illustration only, and not to limit the generality, the present invention will now be explained with reference to its use for allocating time segments of a backplane communication link (a bandwidth-limited, shared resource) in a networking chassis. One skilled in the art will recognize that the present invention is generally applicable to allocation of time segments of any type of bandwidth-limited resource to a number of competing devices. For example, the present invention may be used to control access to a local bus, a switch, a disk drive, a memory bank, or a software process.

Figure 14:
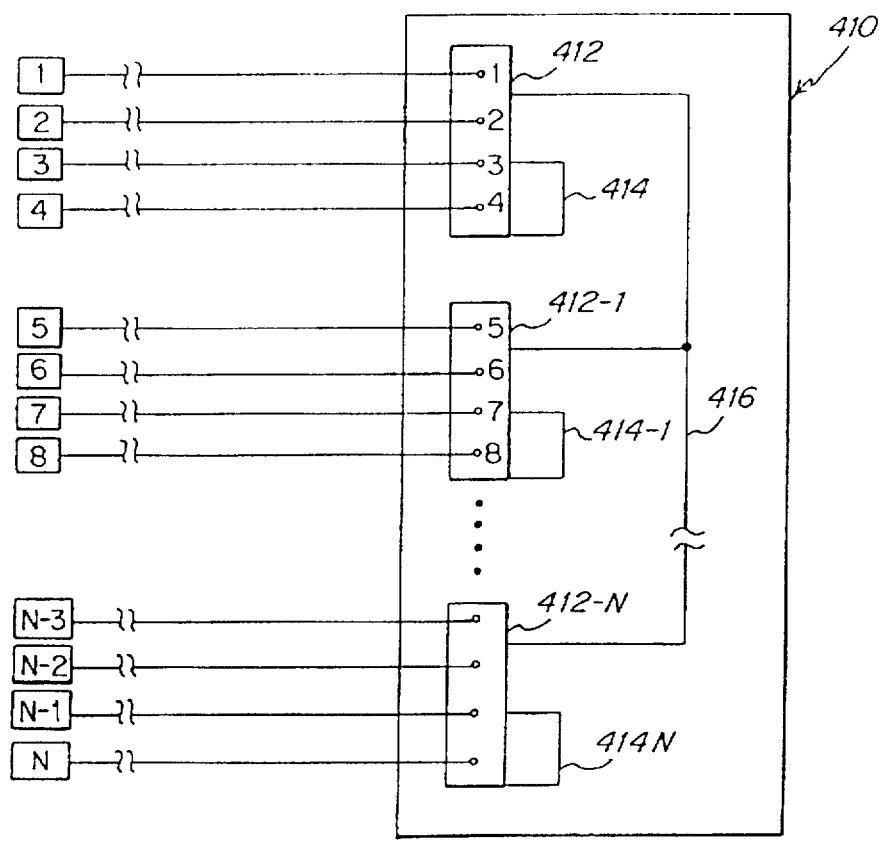
FIG. 14 illustrates a networking chassis with an exemplary application of the bandwidth arbiter of the present invention.

FIG. 14 illustrates a networking chassis 410 that may be, for example, a bridge, router, or hub. The chassis contains a number of slots that can receive plug-in modules 412-1 through 412-N. A backplane including a communication link 416 connects the modules together to provide data transfer and control. Each of the modules 412 includes an arbitration circuit 414 that controls access to backplane communication link 416. The modules contain a number of ports 1-n to which devices that require use of the backplane communication link 416 are connected. The networking chassis 410 is described more fully in a copending and commonly owned application entitled Distributed Chassis Agent For Network Management, by Brendan Fee et al., filed on even date herewith, the disclosure of which is incorporated herein by reference in its entirety. In the networking chassis 410, the backplane communications link has a bandwidth of 4 gigabits. Each of the devices 1–N, which may be peripherals, workstations, network segments, bridges, routers, or other hubs, compete for access to backplane communication link 416 in order to transmit data from one device to another.

Figure 15:
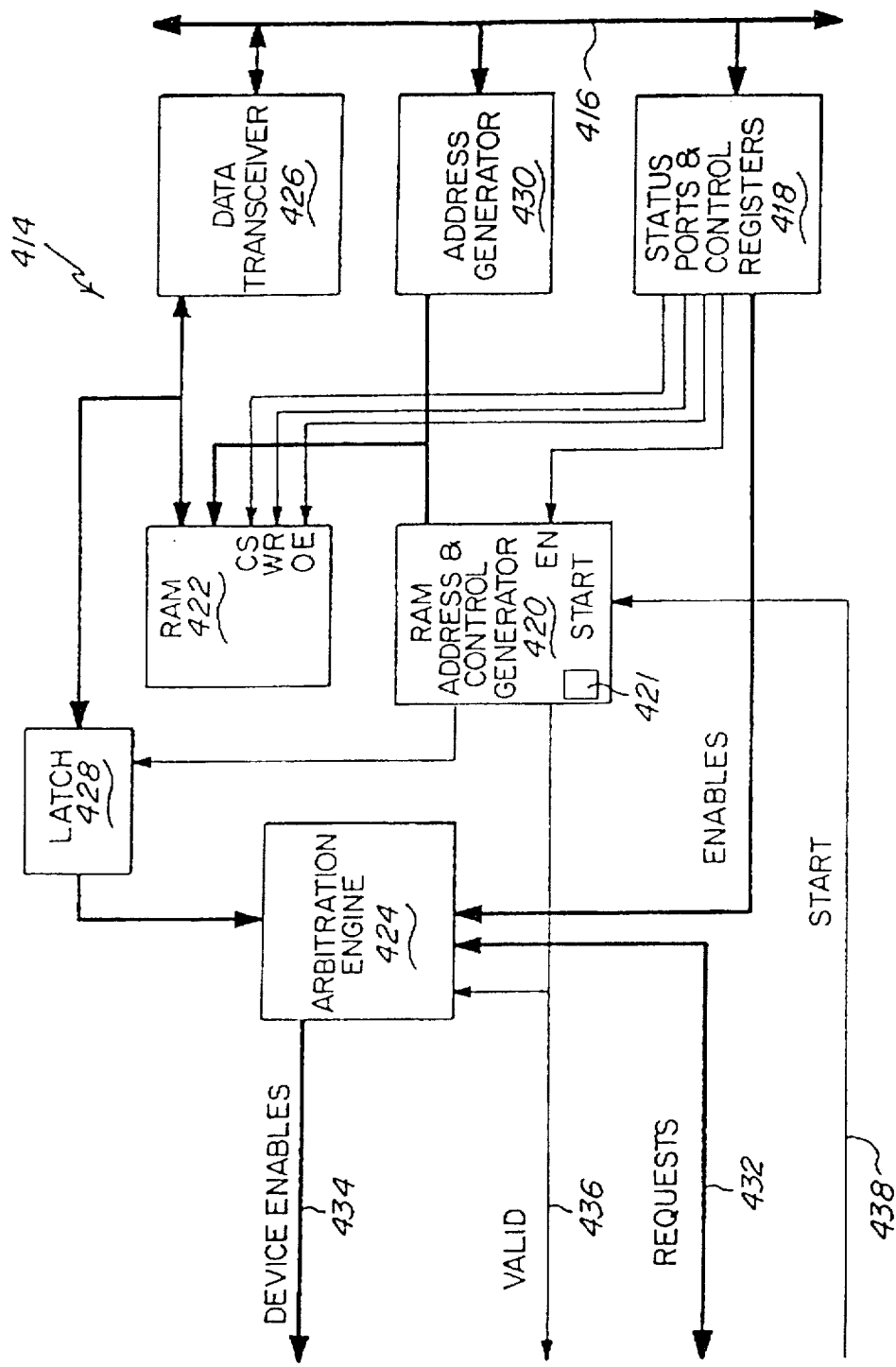
FIG. 15 is a schematic diagram of one embodiment of the arbiter used in the networking chassis of FIG. 14.

FIG. 15 illustrates one embodiment of arbitration circuit 414 illustrated in FIG. 14. In accordance with the method described in the above-described copending application, one or more of the arbitration circuits 414 is chosen to act as arbiter for all of the competing devices connected to all the ports of all modules 412.

Arbitration circuit 414 includes a set of status and control registers 418 that are used to control access to memory 422 and arbitration engine 424 by the CPU (central processing unit, not shown) that is acting as the chassis control agent in accordance with the method and apparatus described in the copending application. The data transceiver 426 provides any necessary interface between communication link 416 and memory 422 and latch 428. Communication link 416 is typically a multibit bus. The latch 428 is used to transfer data from memory 422 or data transceiver 426 to the arbitration engine 424. An address generator 430, which may be a counter, is used to incrementally generate addresses for reading and writing data and control information into and out of memory 422.

The arbitration engine 424 arbitrates between requests received from devices on bus 432 to allocate time segments of backplane communication link 416 to the competing devices using control bus 434. Lines 436 and 438 are used to provide appropriate initialization and control signals.

The first step in setting up the arbitration mechanism of the present invention is to program the length of the time segments and the order in which the time segments are to be allocated. The time segments are typically of equal length and the length of a particular time segment is dependent upon a particular application, the architecture of the communication link 416 and its bandwidth (or the architecture and bandwidth of the particular bandwidth-limited, shared resource that arbitration circuit is to control). For example, if communication link 416 is a bus that is only a few bits wide, the time segments need to be shorter time intervals so that data can be moved quickly. In a like manner, if the communication link 416 is a bus having a relatively wide width (i.e., 32 or 64 bits), then the time segments may be longer time intervals to provide the same bandwidth.

The first level of arbitration performed by arbitration circuit 414 is a programmable time division multiplexing type arbitration. Memory 422 is used to provide this programmability. After memory 422 has been programmed, arbitration engine 424 operates basically as a state machine wherein the states determine which competing device is to be allocated a time segment as a function of the information programmed in memory 422. Each location in the memory is programmed with information indicating which competing device is to have access to the next time segment to be allocated. After the arbitration is performed, address generator 420 increments the memory location so that when arbitration engine 424 accesses the memory during the next state of the state machine, information as to which competing device has rights to exclusive use of communication link 416 is available.

Figure 16:
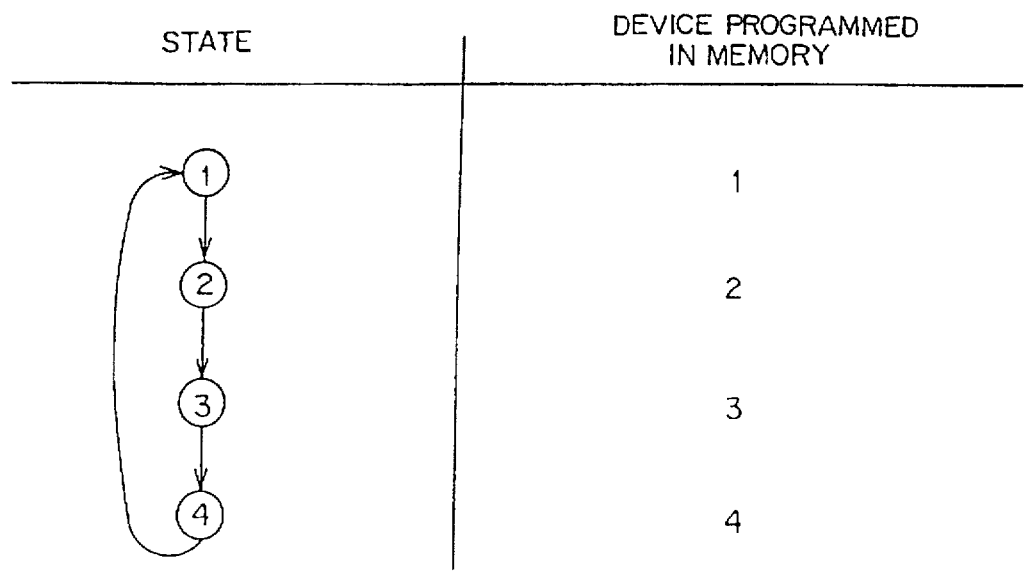
FIG. 16 illustrates a first programmed state machine that may be executed by the circuit of FIG. 14.
Figure 17:
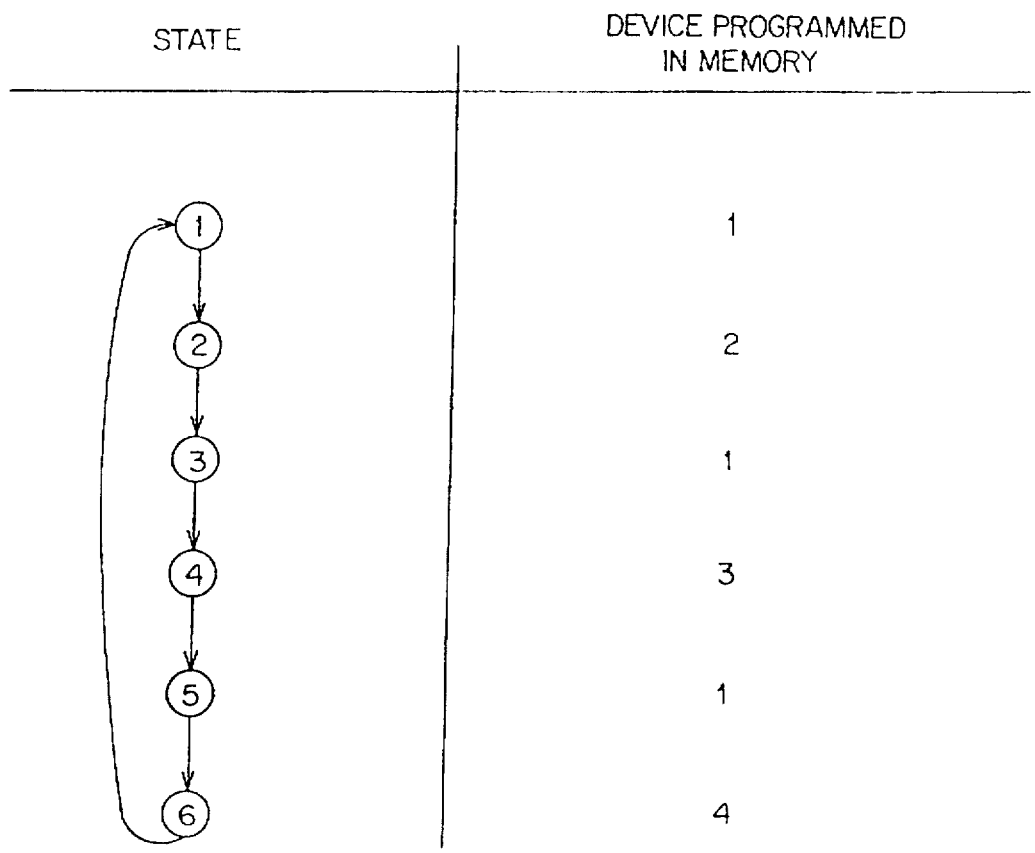
FIG. 17 illustrates a second programmed state machine that may be executed by the circuit of FIG. 14.

FIGS. 16 and 17 illustrate some examples of how the state machine might be programmed and operate. FIG. 16 illustrates the case where all of the competing devices are given equal bandwidth. In state 1, competing device 1 has been programmed in memory 422 as the competing device allocated to the first time segment. In state 2, competing device 2 has been programmed as the competing device allocated to the second time segment. In state 3, competing device 3 has been programmed as the competing device allocated to time segment 3. In state 4, competing device 4 has been programmed as the competing device allocated to time segment 4. From state 4, the state machine returns to state 1 and continues processing. Although only four states and four devices have been illustrated, one skilled in the art will appreciate that the state machine would have as many states as there are devices and memory 422 would have at least as many memory locations for devices as there are competing devices. As is evident from FIG. 16, each competing device has been allocated one-quarter of the available bandwidth.

FIG. 17 illustrates an embodiment in which the time division multiplexing arbiter has been programmed to allocate the bandwidth unequally. In state 1, the time segment is allocated to competing device 1. In state 2, the time segment is allocated to competing device 2. In state 3, the time segment is allocated to competing device 1 again. In state 4, the time segment is allocated to competing device 3. In state 5, the time segment is allocated again to competing device 1. In state 6, the next time slice is allocated to competing device 4. From state 6, the state machine returns to state 1 and processing continues. As is evident from the programmed time division multiplexing scheme illustrated in FIG. 17, competing device 1 has been allocated ½ of the available bandwidth of communication link 16 and the remaining one-half bandwidth has been allocated equally among competing devices 2, 3, and 4. Thus, if competing device 1 required more bandwidth or was a higher priority device, memory 422 can be programmed to accommodate these needs.

One skilled in the art will appreciate that other state machines can be developed along this principle to allocate the bandwidth as needed to various competing devices. As also illustrated in FIG. 17, the programmable time division multiplexing arbitration system provides a first level of arbitration that can be used to assign priorities for access to communication link 416 among the various competing devices.

Figure 18:
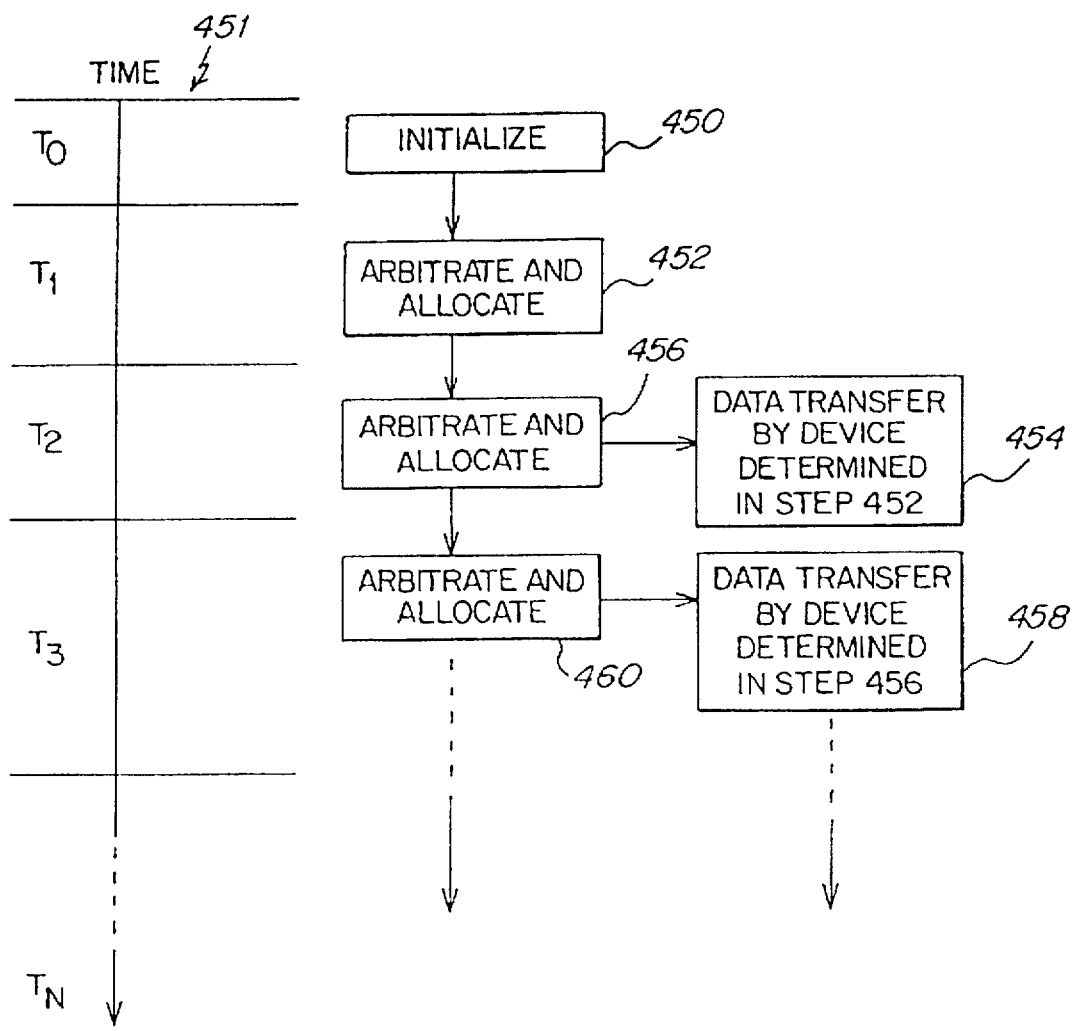
FIG. 18 is a flow chart illustrating how arbitration and allocation of time segments take place simultaneously to improve system efficiency in the present invention.

FIG. 18 illustrates one of the features of the present invention in which arbitration and allocation of time segments are performed during the data transfer cycle just prior to the cycle in which the time segment is to be used. In step 450, the system is initialized. Initialization includes programming memory 422. From step 450, the system proceeds to step 452 in which a first arbitration and allocation step to allocate the first available time segment is performed. This step corresponds to, for example, determining in state 1 of FIGS. 16 or 17, which device is entitled to exclusive access to communication link 416.

From step 452, the system proceeds to step 456 in which another arbitration and allocation step is performed. During arbitration and allocation step 456, the system also proceeds in step 454 to allow a data transfer across communication link 416 by the competing device determined in step 452. From step 456, the system proceeds to step 460 in which another arbitration and allocation step is performed. At the same time that arbitration and allocation step 460 is being performed, a data transfer across communications link 416 by the device determined in step 456 is being performed. As illustrated by time scale 451, during time interval $T_0$, step 450 is performed and during time interval $T_1$, step 452 is performed. During time interval $T_2$, steps 456 and 454 are performed and during time interval $T_3$, steps 460 and 458 are performed. Time intervals $T_0$–$T_n$ are equal sized time intervals. The system continues in this mode of arbitrating and allocating the next available time segment in parallel with a data transfer that is already occurring. Although this results in a penalty because one extra arbitration and allocation step (namely step 452) must be performed before the first data transfer can occur, once this first arbitration and allocation has been performed, the system operates with improved efficiency because allocation and arbitration and data transfer occur simultaneously. In particular, the next available time segment is arbitrated and allocated during the time segment of the previous data transfer.

Referring again to FIGS. 15, 16 and 17, one additional feature of the present invention is the inclusion of a "wrap" register 421 in address and control generator 420. Wrap register 421 is programmed to reset address generator 430 and memory 422 to their first addresses when all of the states of the state machine have been processed. For example, if memory 422 contained 2,000 locations, address generator 430 will control the memories to sequence through all 2,000 addresses until the counter reaches its upper limit and turns over. However, in the situation where there are fewer than 2,000 states in the state machine, as illustrated in FIGS. 16 and 17, further improvements in efficiency can be obtained by programming wrap register 421 with the highest state of the state machine (and/or the highest address location of the memory 422). For example, in FIG. 17, wrap register 421 would be programmed to indicate that the highest state in the state machine is state 6 and would also contain the highest programmed address in memory 422. In each state of the state machine, a check is made of wrap register 421 to determine whether or not the state machine has reached its last state. If the answer is yes, the state machine loops back to state 1 and processing continues. On the other hand, if the check indicates that the last state of the state machine or the highest address in the memory has not been reached, then the state machine and address are incremented to the next state and address, respectively.

The programmable arbitration system of the present invention provides a first level of is arbitration and allows competing devices which require deterministic service policies such as isochronous devices to be serviced with other nondeterministic devices trying to access the communication link 416. This fixed allocation system also guarantees that the bandwidth needed to service an isochronous device is always available.

Figure 19A:
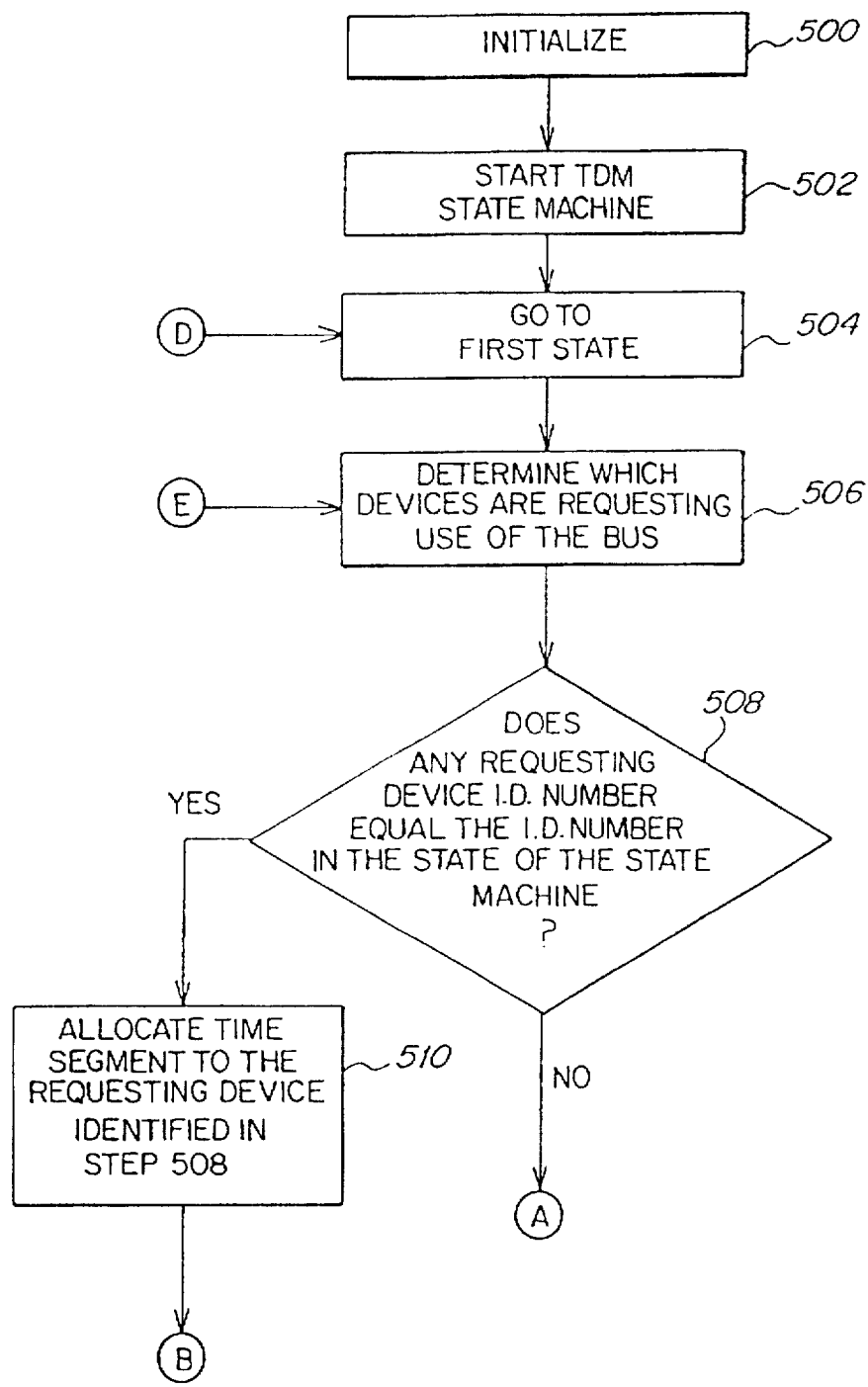
FIG. 19 is a flow chart illustrating the arbitration method of the present invention.
Figure 19B:
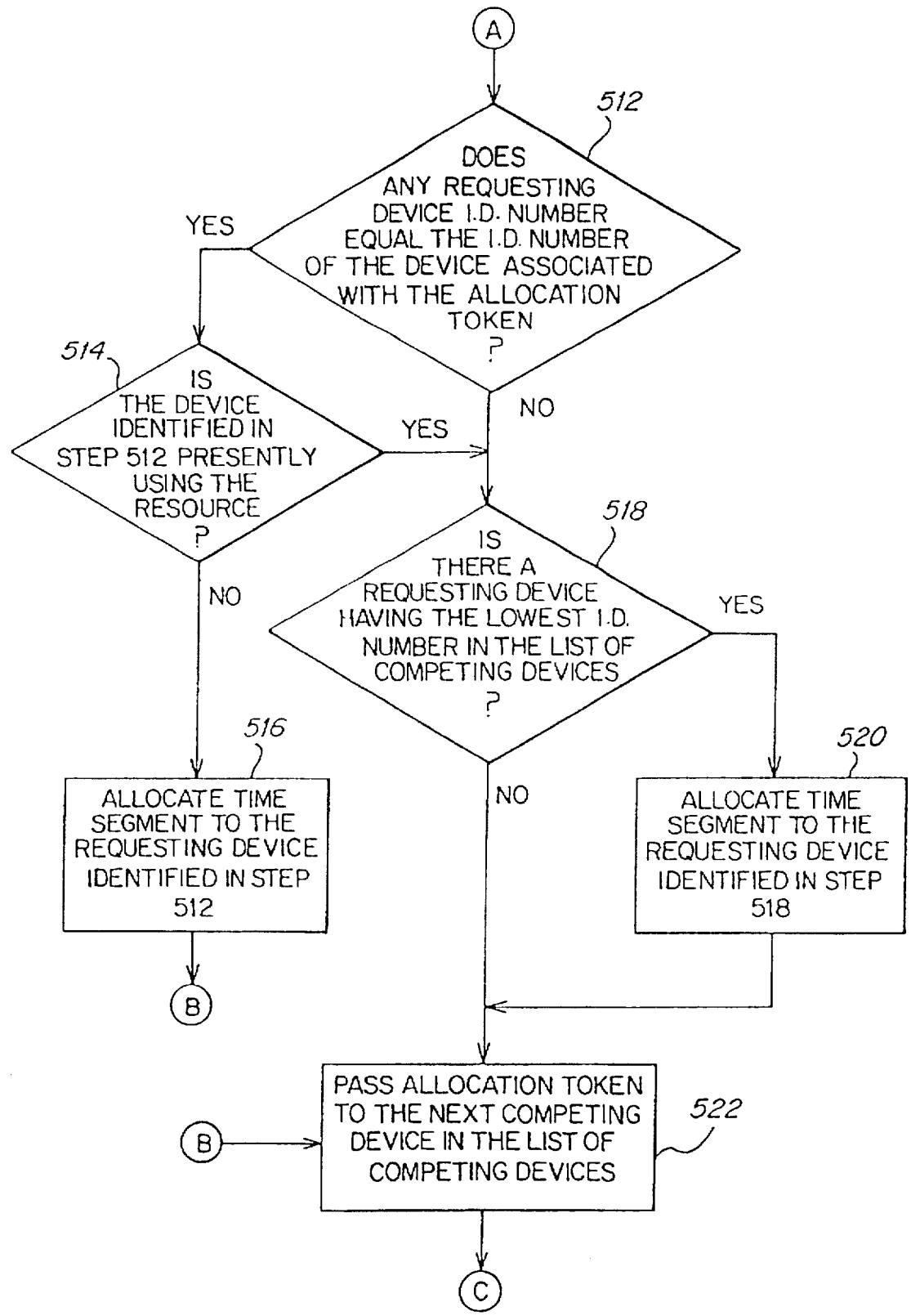
Figure 19C:
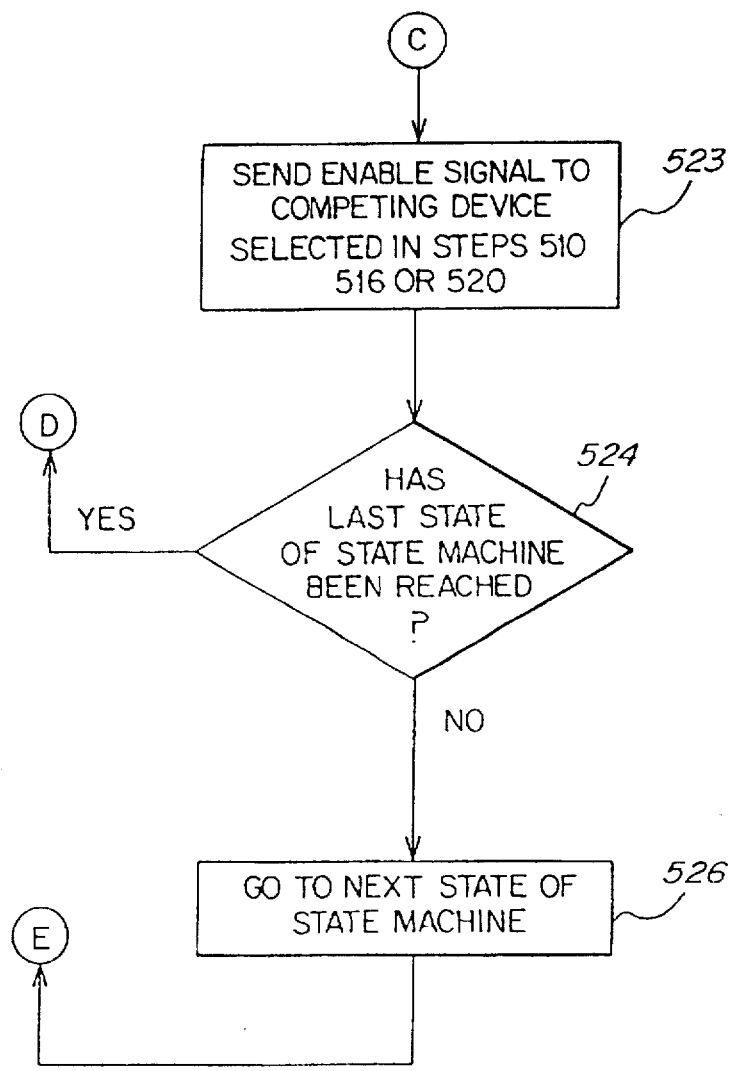

Reference is now made to FIG. 19 which illustrates the method of the present invention including all three levels of arbitration. As will be described, the second and third levels of arbitration, when competing devices have been programmed to use them, allow unused time segments to be allocated to other competing devices in order to improve system performance.

In step 500, the arbitration circuit 414 is initialized. Initialization includes assigning each competing device an identification number and assigning time segments to these identification numbers as illustrated in, for example, FIG. 17. One skilled in the art will appreciate that a competing device may be prohibited from participating in the first level of arbitration by not assigning it a time segment. In addition, a list of the competing device identification numbers is also stored in memory 422 and an allocation token is assigned to one of the competing device identification numbers. Also, initialization includes programming, into memory, which levels of arbitration a competing device may participate in. From step 500, the system proceeds to step 502.

In step 502, the TDM state machine programmed in accordance with, for example, FIGS. 16 or 17, is initialized and a first arbitration and allocation step, such as step 452 in FIG. 18, is performed. From step 502, the system proceeds to step 504 in which the system goes to the first state of the programmed state machine. From step 504, the system proceeds to step 506. In step 506, the system determines which competing devices are requesting use of communications link 416 by monitoring request signals received on, for example, bus 432 in FIG. 15. From step 506, the system proceeds to step 508. In step 508, the system determines whether any requesting device identification number equals the identification number that has been programmed for the next state of the state machine. If the answer is yes in step 508, the system proceeds to step 510 in which the time segment is allocated to the requesting device identified in step 508. On the other hand, if the answer in step 508 is no, the system proceeds to step 512.

In step 512, the system determines whether any requesting device identification number equals the identification number of the device associated with the allocation token that was assigned in initialization step 500. This provides a second level of arbitration. The system also checks if the requesting device has been programmed to participate in the second level of arbitration. If the time segment remains unallocated after the first level of arbitration in step 508, the system provides a second level of arbitration, in step 512, to attempt to assign the unused time segment to another competing device. If the answer is yes in step 512, the system proceeds to step 514 in which the system determines whether the device identified in step 512 is presently using the bandwidth-limited, shared resource, i.e., the communication link 416 illustrated in FIGS. 14 and 15. The purpose of step 514 is to prevent one of the competing devices from hogging the communications link for multiple time segments. If the answer is no in step 514, the system proceeds to step 516 in which the time segment is allocated to the requesting competing device identified in step 512.

Returning to steps 512 and 514, if the answer is no in step 512 or yes in step 514, the system proceeds to step 518. Step 518 provides a third level of arbitration that attempts to make use of the unallocated time segment if the first two levels of arbitration have not assigned the time segment.

In step 518, the system determines whether there is a requesting competing device having the lowest identification number in the list of competing devices and whether that device has been programmed to participate in the third level of arbitration. If the answer is yes in step 518, the system proceeds to step 520 and allocates the time segment to the requesting competing device identified in step 518. From step 520, the system proceeds to step 522. Returning to step 518, if the system determines that there is no device waiting to use communication link 416, then the time segment goes unallocated and the system proceeds to step 522. One skilled in the art will appreciate that although the third level of arbitration is illustrated as assigning the time segment to the device having the lowest identification number, clearly other allocation schemes could be substituted for this step. For example, the time segment could be allocated to the device having the highest identification number in the list of competing devices. More generally, the third level of arbitration allocates the time segment to the requesting competing device having a predetermined rank in the list of competing devices. The predetermined rank may be the lowest identification number, the highest identification number, or the identification number in the middle of the list, for example.

Returning to steps 510 and 516, the system also proceeds to step 522 after these steps. In step 522, the allocation token is passed to the next competing device in the list of competing devices.

From step 522, the system proceeds to step 523 in which an enable signal is sent to the competing device selected in steps 510, 516, or 520.

From step 523, the system proceeds to step 524. In step 524, the wrap register is checked to determine if the last state of the state machine or the last programmed memory location has been reached. If the answer is yes in step 524, the system proceeds to step 504, returning to the first state of the state machine, and processing continues as already described. On the other hand, if the answer in step 524 is no, the system proceeds to step 526. In step 526, the address of memory 422 is incremented and the state machine goes to the next sequential state. From step 526, the system proceeds to step 506 and processing continues as already described.

As can be seen from an examination of FIG. 19, once the system has proceeded through a first arbitration and allocation cycle, the allocation and arbitration steps proceed in parallel with data transfers occurring during a time segment. That is, the system is proceeding through steps 500–522 while the competing device that had been enabled as a result of step 523 in the prior arbitration and allocation cycle is performing a data transfer.

The present invention provides a number of advantages. Typically, conventional TDM type arbiters are hard-coded logic implementations that are not programmable and not easily used in other applications once designed. The present invention, on the other hand, being a programmable memory-based device, is not only programmable, but the same hardware can be used in other applications. The programmable memory also allows the present invention to be configured to allow any time segments or mix of time segments to be assigned to a bandwidth-limited, shared resource rather than having the resources assigned to the same segment in every implementation.

The present invention provides a system in which competing devices that require deterministic and regular service policies can be accommodated, as well as devices that can arbitrarily make use of a bandwidth-limited, shared resource. In addition, the present invention allows unused time segments to be allocated to devices that can make use of them, thus improving the latency of data transmission to or through the bandwidth-limited, shared resource, if the competing devices are programmed to participate in the second and third levels of arbitration. A device can be selected to participate in the second level of arbitration by simply including it in the list of devices that may receive the allocation token. Deleting a device from this list will prevent it from participating in this level of arbitration.

The present invention, since it allows unallocated time segments to be used by competing devices that have not been specifically programmed for a time slice, provides the ability to "over-subscribe" the bandwidth-limited, shared resource. For example, the bandwidth-limited, shared resource may have a bandwidth of 20 megabytes per second, but the maximum aggregate bandwidth of all of the competing requesting devices could be, for example, 25 megabytes per second. In previous systems, the allocation of bandwidth would have forced some or all of the devices to operate at less than full speed due to the bandwidth limitation of the resource. The present invention allows the unused time segments of less active devices to be used by the busier devices. This allows full speed bursts by competing devices to proceed with no hindrance. Thus, the maximum aggregate bandwidth can be greater than the bandwidth of the bandwidth-limited, shared resource.

One way of achieving oversubscription is to assign time segments in the first level of arbitration to only some of the competing devices, such as those requiring a regular or deterministic type of service policy. The remaining competing devices are then programmed to compete in the second and third levels of arbitration to use unallocated time segments resulting after the first level of arbitration. Another way to use the present invention to achieve oversubscription is to assign time segments in the first level of arbitration to all of the competing devices to guarantee that each device has at least one opportunity to use the bandwidth-limited, shared resource. The lower levels of arbitration are then used to allocate unused time segments resulting after the first level of arbitration, thus improving the latency through the bandwidth-limited, shared resource.

The present invention may be implemented in a variety of ways. For example, the invention can be implemented completely in software, completely in hardware, or in a combination of both. As illustrated in FIG. 15, memory 422 can be implemented as static RAM, dynamic RAM, novRAM, or proms. The control circuitry of address generator 430, data transceiver 426, and latch 428 can be fabricated from standard TTL devices, CMOS devices, or incorporated into single chip implementations such as PALS, FPGAs, or ASICS.

Having thus described one particular embodiment of the invention, various alterations, modifications, and improvements will readily occur to those skilled in the art. For example, one skilled in the art will appreciate that the present invention may be applied outside the field of computer networks to any system that requires sharing of a bandwidth-limited resource among competing devices, such as a memory bank or a disk drive in a standalone computer system. Additionally, although a hierarchy of three levels of arbitration has been discussed in detail, any number of levels of arbitration can be used depending upon the particular characteristics of the bandwidth-limited, shared resource and the environment in which it is used. Such alterations, modifications, and improvements are intended to be part of this disclosure, and are intended to be within the spirit and scope of the invention.

10.3 Example of Bandwidth Allocation For SFPS Module

In this example, the previously defined multi-level programmable arbitration is applied to module 32 plugged into networking chassis 30 (see FIG. 4). The module 32 includes an SFPS switch 40, as shown in FIG. 5; the internal operation of the SFPS switch was previously described with regard to FIG. 2. The multi-level programmable arbiter (MPA) 13 (shown in FIG. 2) incorporates the arbitration scheme described in the previous section.

The module 32 includes 12 Ethernet ports (see for example Ethernet port interface 44 in FIG. 5), one backplane port (INB backplane interface 50 in FIG. 5), and one CPU port (host processor 41 in FIG. 5). In this example, we assign a time slice to each Ethernet port and then allocate a slice to the backplane for each Ethernet that is present. This covers the worst case situation of all 12 Ethernets sending traffic to the backplane. In this example, we assign half the bandwidth to the backplane and the remainder to the Ethernet ports.

In this particular application, the switch 40 provides 640 Mbits of bandwidth. Each Ethernet port gets 25.6 Mbits of bandwidth allocated to it, which is more than enough for their needs. The total Ethernet bandwidth is approximately 120 Mbits/sec and the backplane has been allocated 307 Mbits/sec and can therefore pass all the traffic the Ethernets could generate. The host or CPU has only been allocated one slice out of 25 (25.6 Mbits/sec) which if not enough can be supplemented by enabling the round robin and lowest level arbitration cycles so the CPU can also use unclaimed time slices. If desired, the backplane and Ethernet ports can also have the second and third level arbitrations enabled. While there is no bandwidth requirement in this example that would warrant doing so, it may improve module latencies by allowing these ports time slices earlier than they would normally receive them.

FIG. 20 illustrates on the right, the TDM ram programming (first level arbitration) with ram location addresses 0–24 allocated to the designated Ethernets (ports 1–12), backplane (port 0), and host CPU (port 13). The wrap register is set at address 24 so that the TDM will loop back to the first address. The ram is traversed in 25×400 nsec, or approximately 10 usec; the rate of traversal is 100 k/sec. Thus, each Ethernet gets 100 k×256 bits, or 25.6 Mbits/sec. The host gets 100 k×256, or 25.6 Mbits/sec. The backplane gets 100 k×256×12, or approximately 307 Mbits/sec. At the second level of arbitration (not shown), the round robin token continually circulates between all those devices enabled to use it. Similarly, the third level of arbitration is available to those devices enabled to use it, and awards the unused time slice to the lowest requesting device participating in the third level arbitration.

While this example does not seem to put any stringent requirements on the number of slices given a port or how frequently the slices need to appear in the TDM ram, the ports themselves will put requirements on how often they need a slice. For example, the Ethernet ports have 32 byte pre-staged fifos that need to be filled or emptied within a certain time interval. The Ethernet ports having 32-byte fifos need a data transfer of 32 bytes every 32×800 nsec or 25.6 usec. This means that each Ethernet port needs its port ID programmed at no less than a 25.6 usec interval in the TDM ram to insure that no overflow or underflow occur for the device. The 25.6 usec translates to 64 time slices in the TDM ram. As long as the slices for a particular Ethernet port are not further apart in the ram than 64 addresses, no under or over runs of data will occur. FDDI ports would require a different bandwidth allocation.

11. SFPS Software Object Model

A complete functional model of the SFPS may be implemented as software objects within the firmware architecture. The SFPS is integrated within the generalized system architecture which allows it to be a logical application within the system and have access to the resources and communication device drivers.

11.1 SFPS Objects

Figure 21:
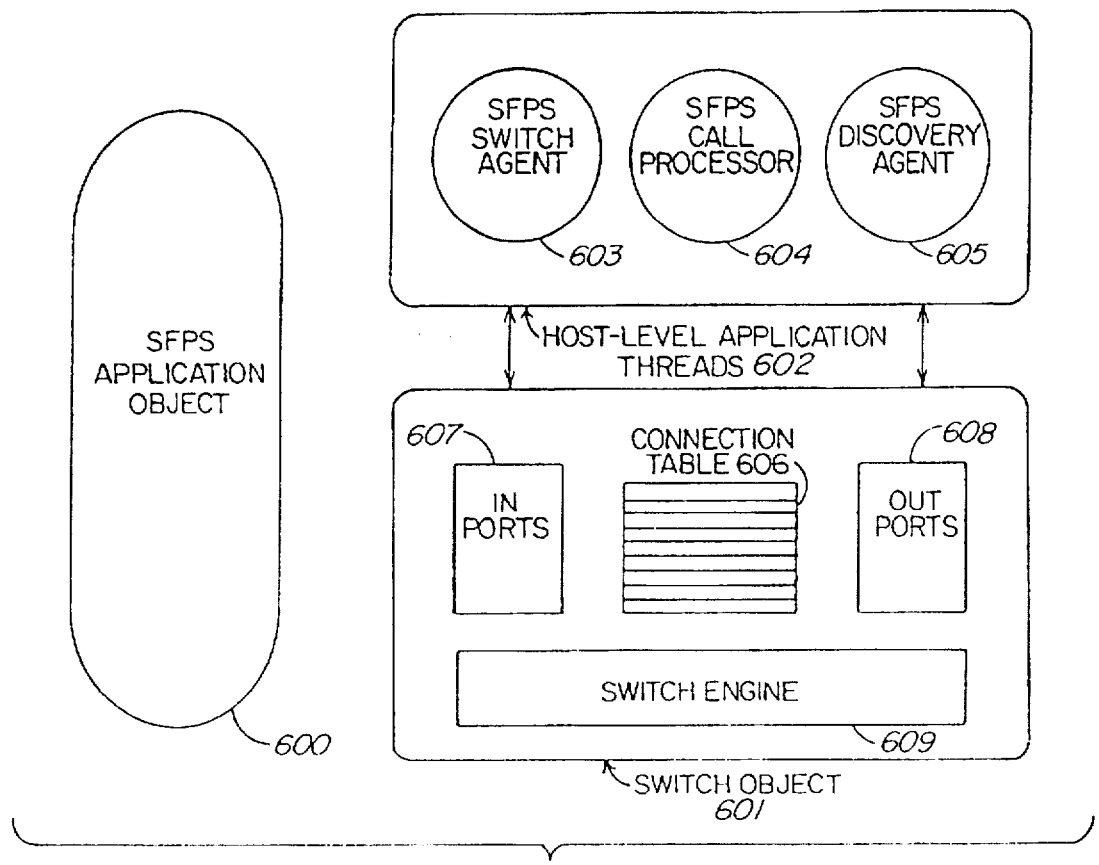
FIG. 21 is an illustration of an SFPS software embodiment.

All of the embedded SFPS is implemented within software objects. Objects are data constructs and associated software that together form an autonomous entity with a private and public interface. The goal of the software-based SFPS is to be portable across many products and platform architectures. FIG. 21 illustrates this system. The following high-level SFPS software objects are platform-independent—that is to say they are common across different system architectures:

SFPS Application Object 600
SFPS Switch Object 601

In addition, SFPS uses application threads 602 that provide external control and access to the SFPS switch. These applications run as clients within a client/server framework. In most cases, the server is either a Network Management System or a Connection Server.

These application threads are as follows:
SFPS Switch Agent 603
SFPS Call Processor 604
SFPS Discovery Agent 605

11.1.1 SFPS Application Object

This object is instantiated at system start-up by a Resource Manager which is responsible for sizing the system and allocating the system device drivers, system resources, and applications. SFPS, at this high level, is instantiated as an Application Resource Object. Within the object constructor, the SFPS Application object instantiates the SFPS Switch Object and the SFPS Application Threads. This SFPS Application Object provides the high-level control and access to all of the objects and threads which are part of the SFPS switch.

11.1.2 SFPS Switch Object

The SFPS Switch Object contains the objects which make up the portable SFPS Switch. As a high-level object, the SFPS Switch object contains (through instantiation) the sub-objects which provide the SFPS switch functionality. These are the Connection Table Object 606, InPort Objects 607, the OutPort Objects 608, and the Switch Engine Object 609.

Connection Table Object—Provides the data and methods for maintaining the cross connect mapping of in-ports and out-ports for each connection. It is indexed, in order, by SFPS connection-identifiers. Connection-identifiers are formed by combining the source-port, the source MAC address, and the destination MAC address of the end stations for which a connection is defined. Note that multi-party connections will have a list of out-ports within the Connection Table. The Connection Table is an AVL-tree (a balanced binary tree) which can grow to arbitrary size. Currently, a maximum of 16,000 connection entries are supported. In addition to providing internal access for the Switch Engine, it also provides call accounting information on each active connection as well as the managed object view for remote management.

Figure 22:
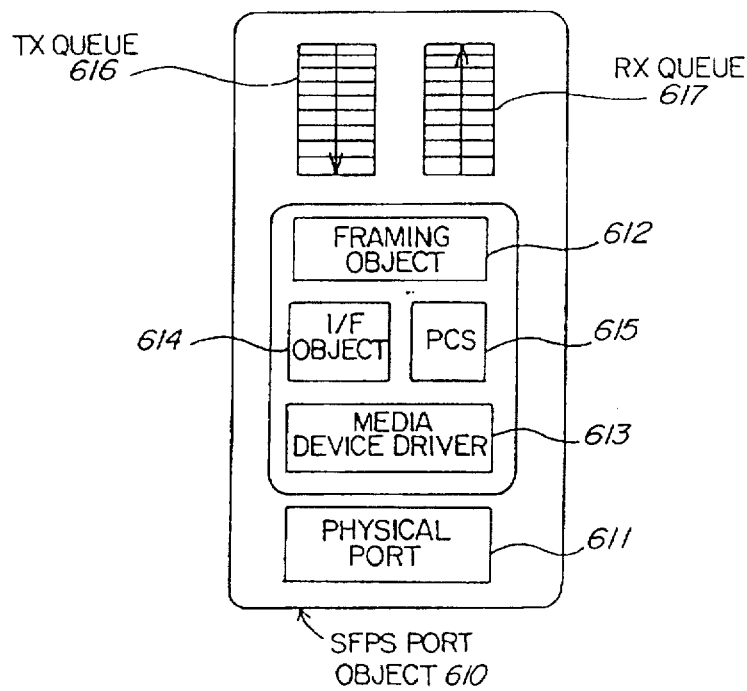
FIG. 22 is an illustration of a port object for the switch of FIG. 21.

Port Objects—Provides the data and methods for configuring and accessing the physical media ports for in-bound and out-bound traffic. As illustrated in FIG. 22, these Port objects 610 are objects that allow SFPS-specific use of physical switch ports 611 within the system. In firmware-based systems, these objects access the physical port through a Framing Object 612 which hides the media-specific framing characteristics of the communication datalink. The Framing Objects, in turn, interface with the media-specific device driver 613 through a common datalink Interface Object 614 and packet memory which is described and accessed with Packet Control Structures (PCS) 615. To provide bandwidth control and rate limiting, these objects have transmit and receive queues 616, 617 which provide the staging of packets into and out of the switch engine. InBound and OutBound Port Objects are derived from these Port Objects.

Switch Engine Object—Provides the data and methods for the actual switching machine of the SFPS. This object implements a TDM and polling software to service in-bound and out-bound ports. The Switch Engine Object is the central engine of the SFPS Switch. It provides the context under which the switching of packets is performed.

11.2 SFPS Application Threads

Several Application Threads exist for SFPS which provide functionality required for SFPS which is not in the SFPS Switch itself. These mainly deal with the access to external servers and control points which exist outside of the embedded device. Each of these threads are instantiated by the SFPS Application Object. Threads are essentially processes or software tasks. Each of the SFPS applications are described below.

SFPS Switch Agent—This thread provides the remote management of the SFPS Switch. It implements the managed objects which are the objects that provide the SNMP-based view of the control and configuration aspects of the switch. These managed objects are also used internally to provide access from the local console. The actual NIB and its managed object definition is included in Appendix 1, which is hereby incorporated by reference in its entirety.

SFPS Call Processor—This thread provides the logic and interface for translating unknown or broadcast packets into third-party call requests. This is a key element of providing access through an SFPS Switch, since the Switch itself will not provide any switching capability until it is "programmed" with connections in the connection table. The Call Processor thread processes packets by decoding the protocol-specific frames, decoding either MAC addresses or network-level addresses inside the network packet to determine the end-to-end system path for the connection and making API message requests to the SFPS Connection Server. The Call Processor specifically translates protocol packets into implied connection requests and asks the SFPS connection server to establish a logical path of switched connections allowing the source and destination end systems to have a uni-directional connection through the SFPS network fabric.

SFPS Discovery Agent—This thread provides the logic and capability to discover adjacent systems attached to the SFPS Switch. Specifically, this thread snoops on protocol packets and determines if it originated from another SFPS Switch (SFPS Adjacency) or from an end system (SFPS user). By snooping the packets it decodes and extracts any address information inside the packet. In particular, the thread extracts the source MAC address and any high-layer protocol addresses and, in turn, registers these with an external SFPS Directory Server. In addition, it maintains a discovery table which shows adjacencies and end systems for each inPort and outPort on the switch.

While there have been shown and described several embodiments of the present invention, it will be obvious to those skilled in the art that various changes and modifications may be made therein without departing from the scope of the invention as defined by the appending claims.

We claim:

1. A method of controlling switches and transmitting data packets in a packet switched data communications network, the network including a plurality of end systems and switches connected by links, each switch having at least one network port connected to another switch and some switches having access ports connected to end systems, the method comprising the steps of:

prior to transmission of a data packet from a first end system to a second end system, determining a first path from the first end system to the second end system through a plurality of switches;

configuring the plurality of switches on the first path to enable transmission of the data packet by providing each switch in the first path with a connection identifier for the data packet, the connection identifier including address information of the first and second end systems; and each switch having a connection database and the configuring step including entering the connection identifier in the connection database of each respective switch on the first path;

wherein, once a first path has been determined, multiple data packets having the same connection identifier are transmitted through the network by accessing the respective connection databases in the respective switches on the first path, without redetermining the first path.

2. The method of claim 1, further including the step of deleting the connection identifier from the connection database of the respective switch after a predetermined time.

3. The method of claim 1, wherein the determining step includes determining a second path for transmission of a data packet from a first end system to a third end system, different from the second end system, and configuring each of the switches on the first path and the second path.

4. The method of claim 1, wherein the determining step is initiated when the data packet enters a first switch adjacent to the first end system, and the data packet is stored during the determining and configuring steps.

5. The method of claim 1, wherein the determining step includes sending a connection setup request to a connection service for determining the first path and configuring the switches.

6. The method of claim 1, wherein the configuring step includes configuring at least one of the switches to send the data packet from one input port of the switch to more than one output port of the switch.

7. The method of claim 1, wherein at least one of the switches on the path transmits data packets received from different end systems but intended for one second end system, out different ports.

8. The method of claim 1, wherein the determining step includes determining the best path utilizing a number of constraints, including one or more of:

bandwidth;

cost;

quality of service; and a maximum number of connections.

9. The method of claim 1, wherein the determining and configuring steps include determining connections based on an application of time constraints.

10. The method of claim 1, wherein the determining step includes determining the first path based on allocation of bandwidth.

11. The method of claim 1, wherein a network management system provides at least one of the following services:

(a) determination of the first path;

(b) designation of authorized valid connections between first and second end systems;

(c) determination of the location of end systems;

(d) accounting of each end system's usage of the network based on the number of data packet or byte transmissions; and (e) designation of a specified bandwidth for valid connections between designated end systems.

* * * * *